US011967195B2

(12) United States Patent
Togano et al.

(10) Patent No.: US 11,967,195 B2
(45) Date of Patent: Apr. 23, 2024

(54) PAPER SHEET STORAGE UNIT AND PAPER SHEET PROCESSING DEVICE

(71) Applicant: Japan Cash Machine Co., Ltd., Osaka (JP)

(72) Inventors: Keiichi Togano, Osaka (JP); Shinya Izawa, Osaka (JP)

(73) Assignee: JAPAN CASH MACHINE CO., LTD., Osaka (JP)

( * ) Notice: Subject to any disclaimer, the term of this patent is extended or adjusted under 35 U.S.C. 154(b) by 792 days.

(21) Appl. No.: 17/042,679

(22) PCT Filed: Jan. 9, 2019

(86) PCT No.: PCT/JP2019/000328
§ 371 (c)(1),
(2) Date: Sep. 28, 2020

(87) PCT Pub. No.: WO2019/187480
PCT Pub. Date: Oct. 3, 2019

(65) Prior Publication Data

US 2021/0125448 A1 Apr. 29, 2021

(30) Foreign Application Priority Data

Mar. 29, 2018 (JP) ................................ 2018-063983

(51) Int. Cl.
*G07D 11/40* (2019.01)
*B65H 5/02* (2006.01)
(Continued)

(52) U.S. Cl.
CPC ............ *G07D 11/40* (2019.01); *B65H 5/023* (2013.01); *B65H 5/26* (2013.01); *B65H 5/36* (2013.01);
(Continued)

(58) Field of Classification Search
CPC . B65H 5/023; B65H 5/26; B65H 5/36; B65H 2402/10; B65H 2402/32;
(Continued)

(56) References Cited

U.S. PATENT DOCUMENTS

2002/0162775 A1* 11/2002 Saltsov .................. B65H 29/58 209/534
2011/0094850 A1* 4/2011 Seki ....................... G07D 11/12 194/302
(Continued)

FOREIGN PATENT DOCUMENTS

CN 103650008 A 3/2014
CN 205942876 U 2/2017
(Continued)

OTHER PUBLICATIONS

WIPO, Japanese International Search Authority, International Search Report (with English translation) and Written Opinion dated Feb. 12, 2019 in International Patent Application No. PCT/JP2019/000328, 9 pages.
(Continued)

*Primary Examiner* — Prasad V Gokhale
(74) *Attorney, Agent, or Firm* — MASUVALLEY & PARTNERS; Peter Martinez

(57) ABSTRACT

Provided is a circulation-type paper sheet storage unit equipped with circulation units in a casing, enabling to swiftly take measures and perform recovery processing on the user side when the circulation unit malfunctions. The paper sheet storage unit includes circulation units (100 and 200) that are accommodated in a casing 60 to receive paper sheets transported into the casing by operating upon reception of a drive force from a motor and feed paper sheets stored therein to outside of the casing. The casing includes guide members 620 that serve as a guide at the time of attaching or detaching the circulation unit with respect to the
(Continued)

casing, and the circulation unit includes guided members (655A, 675A, 655B, and 675B) which respectively detachably engage with the guide member, and are guided to an installation completion position along the guide members in an engaged state.

7 Claims, 20 Drawing Sheets

(51) Int. Cl.

| | |
|---|---|
| ***B65H 5/26*** | (2006.01) |
| ***B65H 5/36*** | (2006.01) |
| ***G07D 11/13*** | (2019.01) |
| ***G07D 11/50*** | (2019.01) |

(52) U.S. Cl.
CPC ............. *G07D 11/13* (2019.01); *G07D 11/50* (2019.01); *B65H 2402/10* (2013.01); *B65H 2701/1912* (2013.01); *G07D 2211/00* (2013.01)

(58) Field of Classification Search
CPC ............ B65H 2402/40; B65H 2402/44; B65H 2402/441; B65H 2701/1912; G07D 11/13; G07D 11/18; G07D 11/40; G07D 11/50; G07D 2211/00
See application file for complete search history.

(56) References Cited

U.S. PATENT DOCUMENTS

| | | | | |
|---|---|---|---|---|
| 2014/0191466 A1* | 7/2014 | Yokote | B65H 5/00 271/264 |
| 2015/0021385 A1* | 1/2015 | Michels | G07D 11/0096 312/212 |
| 2017/0103620 A1* | 4/2017 | Vankirk | G07D 11/50 |

FOREIGN PATENT DOCUMENTS

| | | | |
|---|---|---|---|
| DE | 102011053101 | A1 | 2/2013 |
| JP | 2003-525505 | A | 8/2003 |
| JP | 2004-103040 | A | 4/2004 |
| JP | 2013-109500 | A | 6/2013 |
| JP | 2014088240 | A | 5/2014 |
| JP | 2016218965 | A | 12/2016 |

OTHER PUBLICATIONS

Indian Office Action dated Feb. 24, 2021 in Indian Application No. 202037040985, with English translation 6 pages.
Extended European Search Report, dated Nov. 4, 2011 in EP19775621.6 (7 pages).

* cited by examiner

FIG.12(a-1)
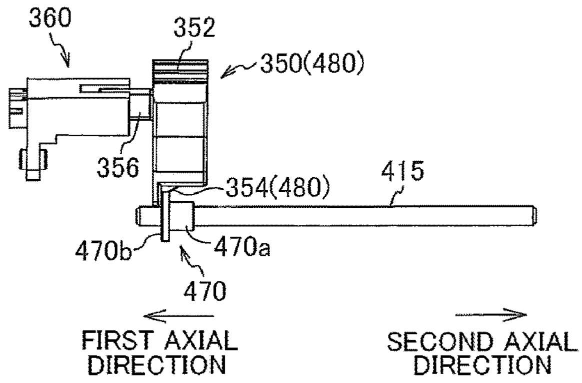
FIG.12(b-1)
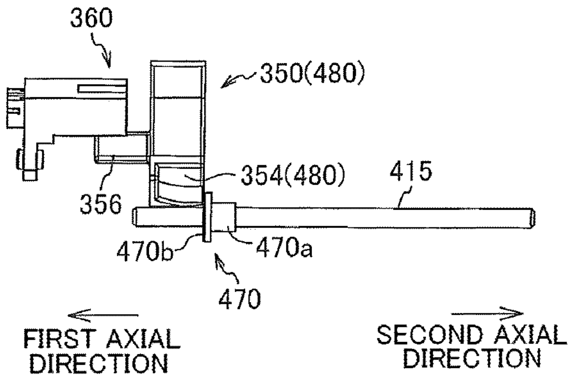
FIG.12(a-2)
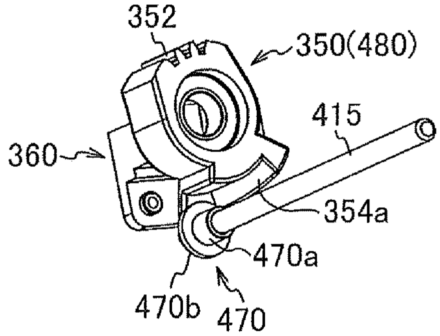
FIG.12(b-2)
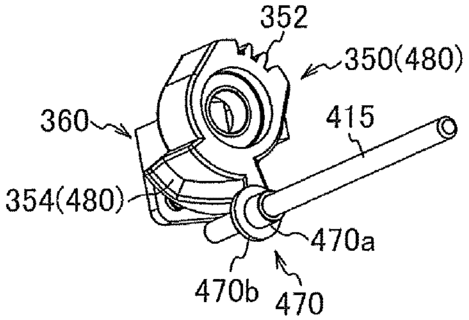
FIG.12(a-3)
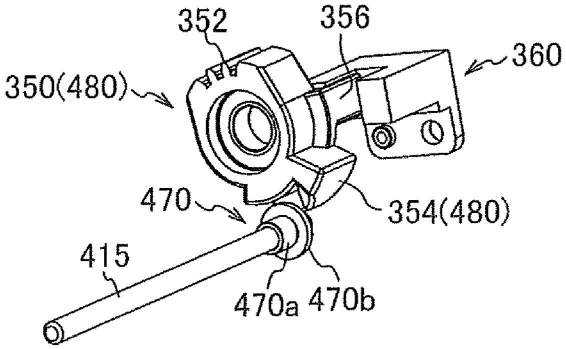
FIG.12(b-3)
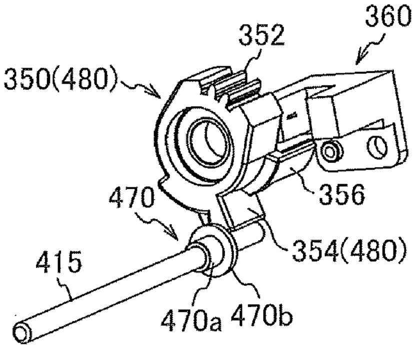

A-A SECTIONAL VIEW

B-B SECTIONAL VIEW

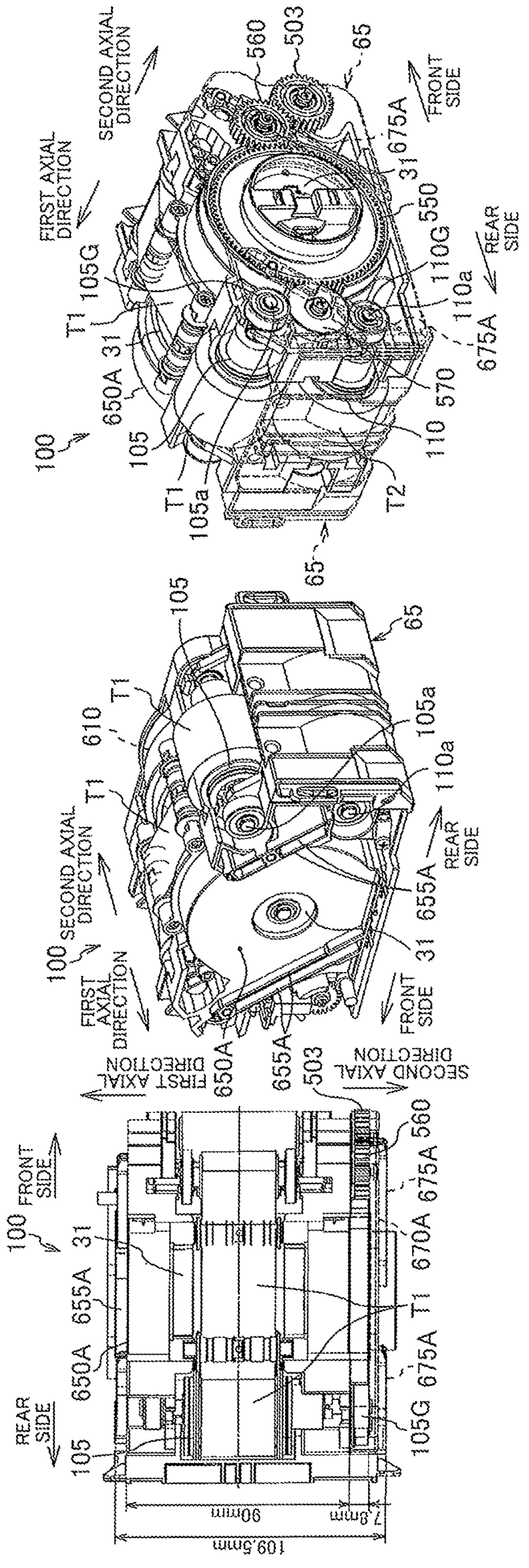
FIG.19(a-1)
FIG.19(a-2)
FIG.19(a-3)

FIG.19(b-1)
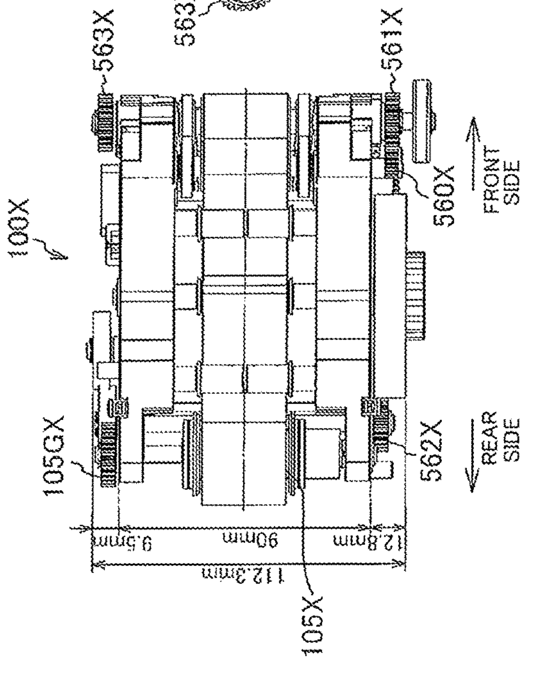
FIG.19(b-2)
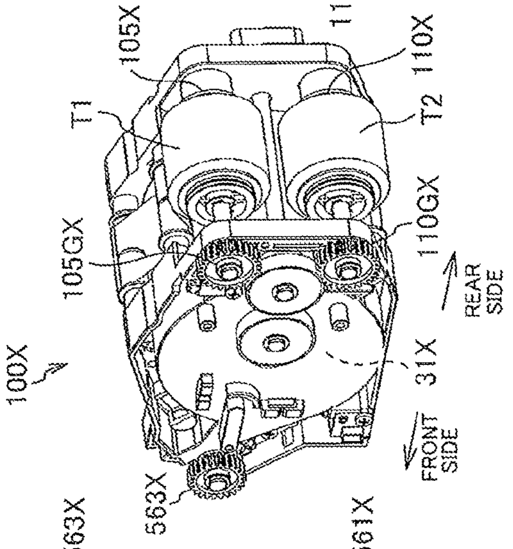
FIG.19(b-3)
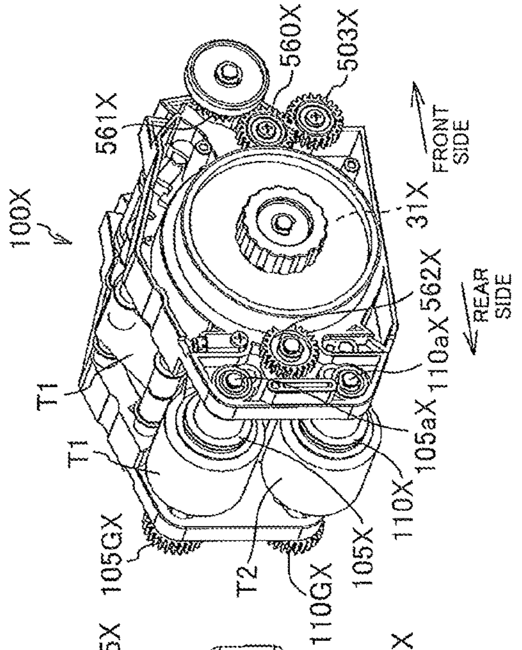

PAPER SHEET STORAGE UNIT AND PAPER SHEET PROCESSING DEVICE

RELATED APPLICATIONS

This application is the U.S. National Phase of and claims priority to International Patent Application No. PCT/JP2019/000328, International Filing Date Jan. 9, 2019 , entitled Paper Sheet Accommodation Unit And Paper Sheet Processing Device; which claims benefit of Japanese Application No. 2018-063983 filed Mar. 29, 2018; both of which are incorporated herein by reference in their entireties.

FIELD

The present invention relates to a paper sheet storage unit including a detachable guide mechanism of a circulation unit that can swiftly take measures and perform recovery processing on the user side when the circulation unit malfunctions in a circulation-type paper sheet storage unit, and a paper sheet processing device.

BACKGROUND

As a banknote processing device installed in a banknote handling device such as a vending machine having a function of providing various articles and services by receiving an input banknote, a game-medium lending machine in a game hall, a ticket machine, a cash machine, and a money changer, a circulation-type banknote processing device capable of receiving, storing, and dispensing banknotes of a plurality of denominations has been known.

The circulation-type banknote processing device is provided with a banknote storage unit for storing therein banknotes prepared for payout beforehand and banknotes input during operation by denomination, or in a state of mixed denominations.

There are a circulation-type banknote storage unit having a function of storing banknotes and discharging banknotes to outside as change, and a banknote storage unit for collection (a collection box) that collects all the banknotes in the banknote processing device at the closing time or the like, as the banknote storage unit.

As the circulation-type banknote storage unit, such a type has been known in which banknotes are stored between tapes overlapped and wound spirally (helically) around an outer periphery of a circulation drum, such as a "banknote handling device" disclosed in Patent Literature 1. Further, in the patent literature, banknotes of different denominations can be stored by juxtaposing units constituted by two circulation drums and bobbins in one circulation-type banknote storage unit.

However, in the circulation-type banknote storage unit, since two circulation drum units are fixed to a casing by using many screws, if a trouble such as paper jam occurs between the tapes in one of the circulation drum units, it is required to resolve the jam by disassembling the circulation drum unit by detaching the screws on the user side. Such operation is quite difficult for a user. As the measures against such trouble, an operating member that manually rotates a rotation shaft of the circulation drum is arranged on an external side of the casing to rotate the circulation drum by manual operation, thereby taking out the banknote jammed between the tapes. However, depending on the paper jam state, jam processing only by manually rotating the circulation drum is difficult, and such problems have frequently occurred that the tape is adversely excessively loosened, twisted, and distorted, or becomes a complicatedly tangled state, to make restoration impossible.

When such situation occurs, it is necessary to request a maintenance personnel to repair or replace the circulation drum unit. However, it causes a considerable decrease in the operating rate of the banknote handling device, and thus an improvement has been strongly desired.

CITATION LIST

Patent Literature

Patent Literature 1: Japanese Patent Application Laid-open No. 2016-218965

SUMMARY

Technical Problem

The present invention has been achieved in view of the problems described above, and an object of the present invention is to provide a paper sheet storage unit including a detachable guide mechanism of a circulation unit that enables to take measures and perform recovery processing swiftly on the user side when the circulation unit malfunctions, in a circulation-type paper sheet storage unit equipped with the circulation unit in a casing, and a paper sheet processing device.

Solution to Problem

In order to achieve the above object, a paper sheet storage unit according to the present invention comprises: a casing; and a circulation unit that is accommodated in the casing to receive paper sheets transported into the casing by operating upon reception of a drive force from a motor and feed paper sheets stored therein to outside of the casing, wherein the casing includes a guide member that serves as a guide at a time of attaching or detaching the circulation unit to or from the casing by slidingly moving the circulation unit with respect to the casing, and the circulation unit includes a guided member, which detachably engages with the guide member, and is guided to an installation completion position along the guide member in an engaged state.

Advantageous Effects of Invention

According to the present invention, it is possible to take measures and perform recovery processing swiftly on the user side when a circulation unit malfunctions, in a circulation-type paper sheet storage unit equipped with the circulation unit in a casing.

BRIEF DESCRIPTION OF DRAWINGS

FIGS. 12(*a*-1), (*a*-2), and (*a*-3) and (*b*-1), (*b*-2), and (*b*-3) are explanatory diagrams illustrating a state in which the cam gear activates the pressurizing member.

FIG. 19(*a*) is an explanatory diagram of a configuration of the first circulation drum unit according to the present invention, and FIG. 19(*b*) is an explanatory diagram of a configuration of a circulation drum unit according to a comparative example.

DESCRIPTION OF EMBODIMENTS

Figure 1A:
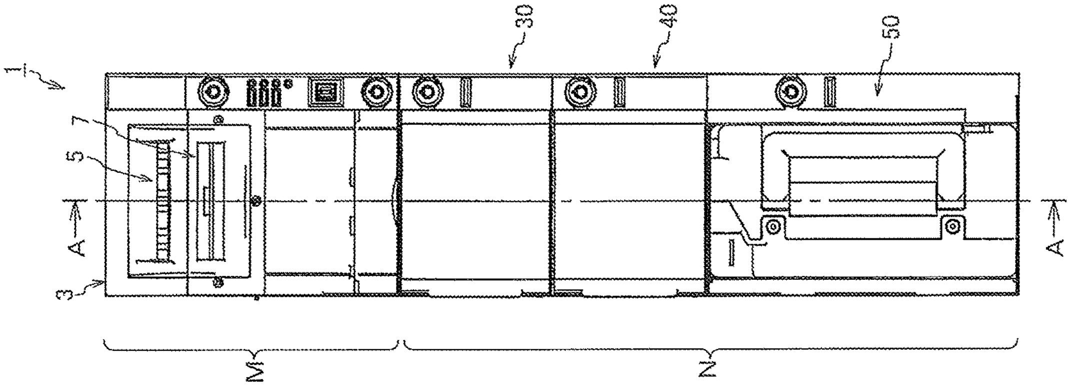
FIGS. 1(*a*) and (*b*) are respectively a front elevation and an A-A sectional view of a banknote (paper sheet) processing device including a drive transmission switching mechanism and a paper sheet storage unit according to one embodiment of the present invention.

The present invention will be described below in detail with embodiments illustrated in the drawings.

Configuration of Banknote Processing Device

Figure 1B:
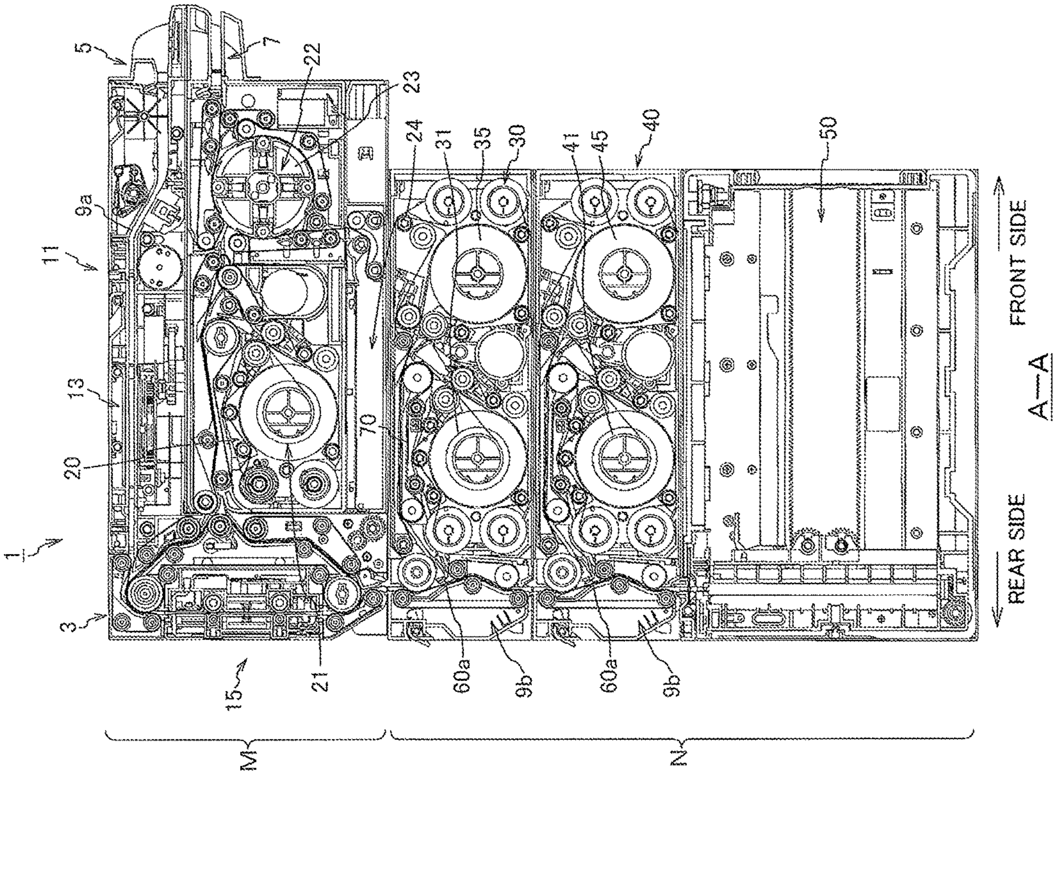

FIGS. 1(*a*) and (*b*) are respectively a front elevation and an A-A sectional view of a banknote (paper sheet) processing device including a paper sheet storage unit according to one embodiment of the present invention.

In the present embodiment, although a device that processes banknotes as an example of paper sheets is described, the paper sheet storage unit and the paper sheet processing device according to the present invention can be also applied to a processing device of general paper sheets such as cash vouchers, tickets, and marketable securities, other than banknotes.

A circulation-type banknote processing device (hereinafter, "banknote processing device") 1 illustrated in FIG. 1 is a unit that is installed in or together with a banknote handling device, for example, a vending machine, a ticket machine, a game-medium lending machine in a game hall, a cash machine, or a money changer, to receive banknotes and dispense banknotes as change or the like.

Figure 2A:
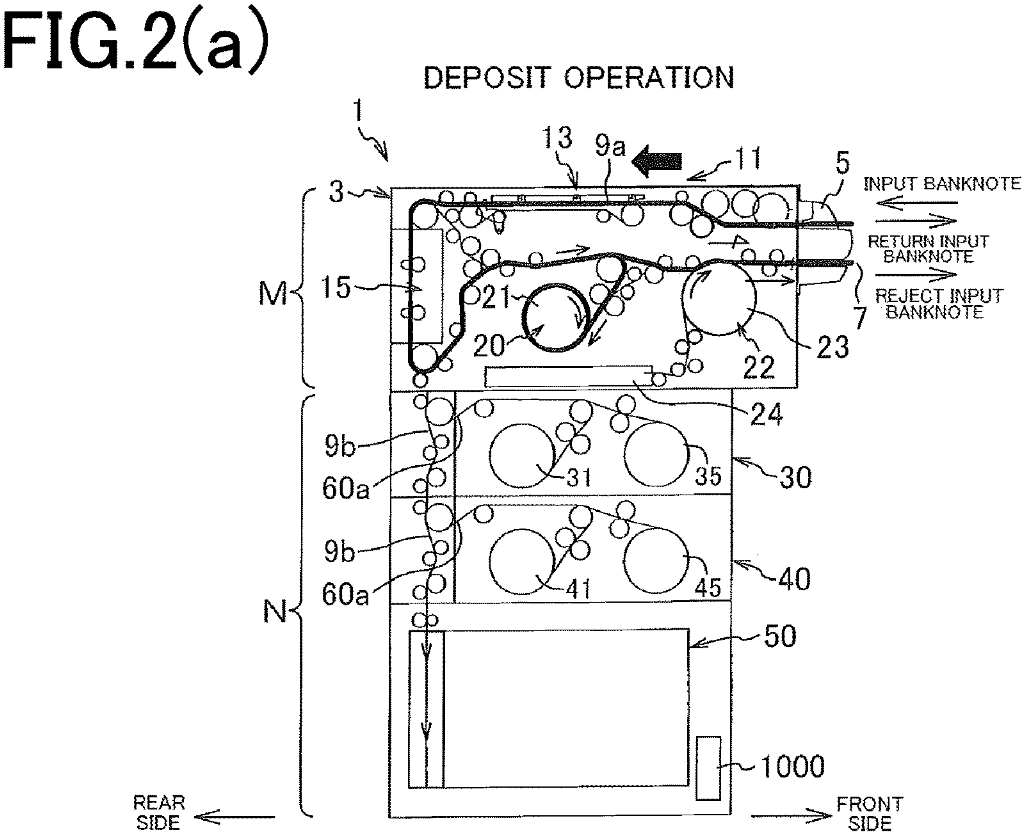
FIGS. 2(*a*) and (*b*) are explanatory diagrams illustrating a deposit operation and a confirmation operation of the banknote processing device.
Figure 2B:
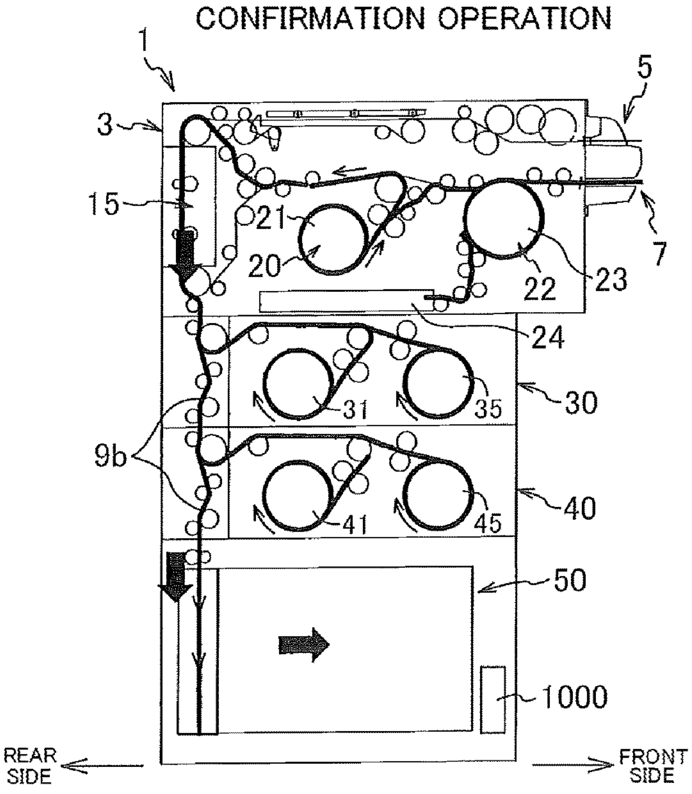
Figure 3A:
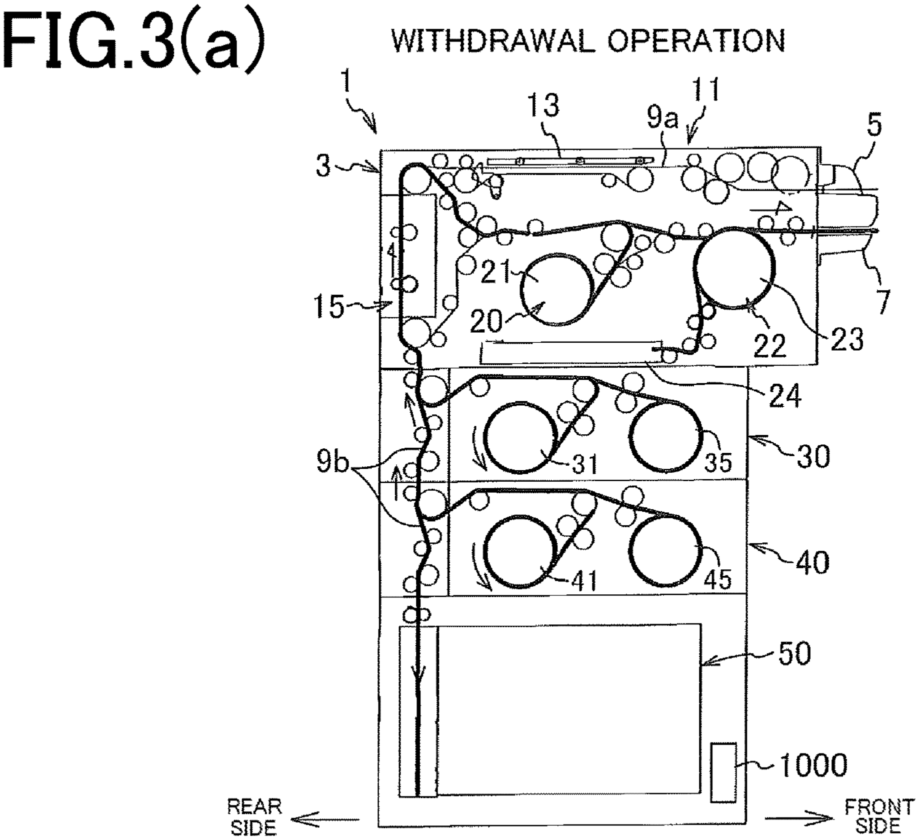
FIGS. 3(*a*) and (*b*) are explanatory diagrams illustrating a withdrawal operation and a collection operation of the banknote processing device.
Figure 3B:
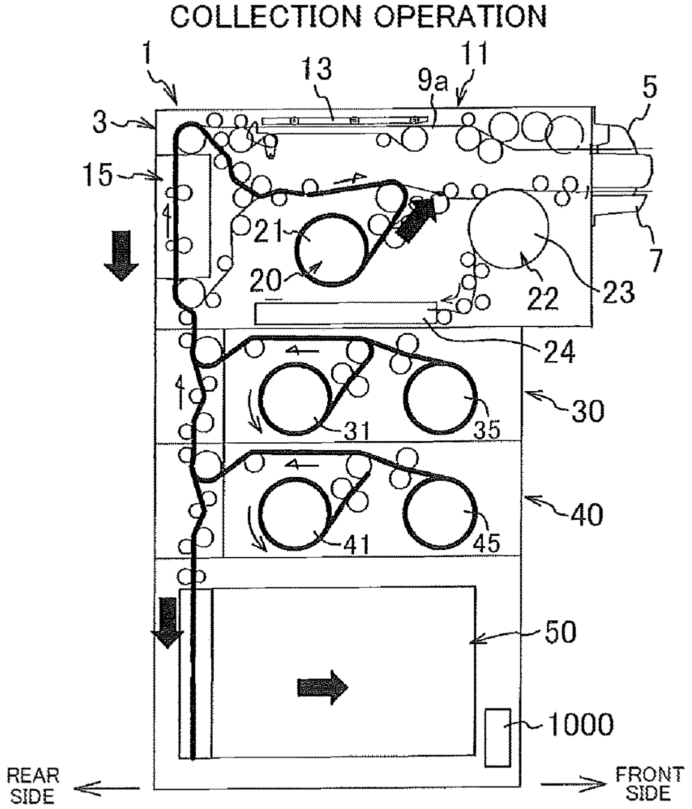

The banknote processing device 1 is schematically constituted by a housing 3 constituting an exterior body, a deposit and withdrawal processing unit M that transports a banknote inserted into the housing in a required route in the machine and discharges a banknote to outside, a banknote storage unit N that stores therein a banknote transported from the deposit and withdrawal processing unit M and transfers banknotes between the deposit and withdrawal processing unit M and the banknote storage unit N, a transport mechanism that transports banknotes through various routes, and a control unit (a CPU, an MPU, a ROM, a RAM, or the like) 1000 that controls various control targets (FIG. 2 and FIG. 3).

The deposit and withdrawal processing unit M includes an input/output port 5 that collectively receives a bundle of banknotes up to 30 sheets including banknotes of different denominations and becomes a return port at the time of returning input banknotes, a return port 7 that becomes a dispensing port of banknotes up to 30 sheets and an input-rejection return port, and a collective deposit unit 11 that separates a bundle of banknotes input and set in the input/output port 5 from each other and introduces each banknote into a device body along a stored-banknote a stored-banknote transport route 9*a*. The deposit and withdrawal processing unit M also includes a centering unit 13 arranged on a downstream side of the collective deposit unit 11 to align the position in a width direction of a transported banknote to the center of a transport route, a recognition unit 15 arranged on a downstream side of the centering unit to judge the denomination and the authenticity of the input banknote by using an optical sensor and a magnetic sensor together, an escrow unit (temporary holding unit) 20 that temporarily holds the input banknotes having passed the recognition unit up to 30 sheets, and after acceptance is confirmed, feeds the banknote to each of a storage unit and a collection box described later, or at the time of cancellation and return due to a return request or the like, feeds the banknote to a payout stacking unit (payout stacking device) 22, and the payout stacking unit (stacking device of returned banknotes) 22 that once stacks banknotes to be returned or rejected banknotes transported from the escrow unit (hereinafter, "returned banknote"), and then discharges the banknotes to the return port 7. Further, the deposit and withdrawal processing unit M includes a forgotten-banknote storage unit (banknote holding unit) 24 in which, when a returned banknote paid out from the payout stacking unit 22 to the return port 7 is not collected by a customer even after a predetermined time has passed, the banknote is transported in a reverse direction by the payout stacking unit and stored therein as a forgotten banknote.

The banknote storage unit N includes first and second circulation-type banknote storage units (circulation-type banknote storage devices) 30 and 40 that accommodate therein banknotes fed from the escrow unit 20 one by one when acceptance of the input banknotes is confirmed, and transported on the stored-banknote transport routes 9*a* and 9*b* for each denomination so that the banknotes can be taken in and out, and a collection box (collected-banknote storage unit) 50 detachably attached into an accommodation space provided below the second circulation-type banknote storage unit 40 from a front side, to collect all denominations of banknotes from each circulation-type banknote storage unit at the closing time or the like, and collect high-denomination banknotes that are not used as change and excessive banknotes that cannot be accommodated in each circulation-type banknote storage unit.

The transport mechanism includes a motor, a solenoid, and a pulley for generating and transmitting a drive force for transporting banknotes along the respective transport routes 9*a* and 9*b* and other transport routes, a belt, a gate, and the like.

A control unit 1000 controls control targets such as the deposit and withdrawal processing unit M, the banknote storage unit N, the transport mechanism, and the like.

The maximum number of banknotes to be handled in the input/output port 5 and the return port 7 is only an example.

Each of the first and second circulation-type banknote storage units 30 and 40 in the present example includes two circulation drums (31, 35, 41, and 45) respectively having the maximum storage number of 60 sheets. The respective circulation drums 31, 35, 41, and 45 are of a type suitable for circulation in which a banknote is stored between two long tapes (long films) overlapped and spirally (helically) wound around respective outer peripheries of these drums.

Since the first and second circulation-type banknote storage units 30 and 40 include a drive transmission switching mechanism 400 described later, the first and second circulation-type banknote storage units 30 and 40 can respectively drive the two circulation drums 31 and 35, and the two circulation drums 41 and 45 by a single motor.

Various Operations of Banknote Processing Device

Next, an outline of a deposit operation, a confirmation operation, a withdrawal operation, and a collection operation in the banknote processing device 1 illustrated in FIG. 1 is described with reference to FIG. 2 and FIG. 3.

That is, FIGS. 2(*a*) and (*b*) are explanatory diagrams illustrating the deposit operation and the confirmation operation of the banknote processing device, and FIGS. 3(*a*) and (*b*) are explanatory diagrams illustrating the withdrawal operation and the collection operation of the banknote processing device.

First, in the deposit operation in FIG. 2(*a*), when one or a plurality of sheets of banknotes are input from the input/output port 5, upon reception of a signal from a sensor having detected the banknotes, the control unit 1000 activates the transport mechanism to take in the banknotes by using the collective deposit unit 11 and the input-banknote transport route 9*a*. The collective deposit unit 11 extracts the banknotes one by one from the uppermost banknote in the bundle of banknotes set in the input/output port 5, and transports the extracted banknote to the centering unit 13. The banknote having been subjected to centering in the centering unit is moved to the recognition unit 15 to be recognized. The banknote judged to be acceptable by the recognition unit 15 is transported to the escrow unit 20, in which the banknotes are wound one by one around an outer periphery of an escrow drum 21 and temporarily held, to wait for confirmation of the deposit. If a rejected banknote, which has been judged to be unacceptable in the recognition unit, is a banknote input one by one from the input/output port 5, the banknote is directly discharged to outside from the return port 7. Meanwhile, when a plurality of banknotes collectively input have been rejected, the banknotes are once stacked (one to plural sheets) in the payout stacking unit 22, and are then discharged to outside and returned collectively from the return port 7. Further, when a customer requests return of banknotes by operating a cancel button (not illustrated), the banknotes temporarily held in the escrow unit 20 are fed to the payout stacking unit 22 one by one, overlapped on each other one after another and wound on an outer periphery of a rotating payout drum 23, and are stacked in a layered state. When stacking of all the banknotes input by the customer on the outer periphery of the payout drum is completed, the payout drum 23 is rotated in a payout direction, to cause the bundle of banknotes to project outside and be returned from the return port 7, thereby promoting the customer to receive the banknotes.

If the bundle of banknotes projected to outside for return from the return port 7 are not collected by the customer even after a predetermined time has passed, the payout drum is reversely rotated in a return direction to transport the banknotes into the machine, and stored as forgotten banknotes in the forgotten-banknote storage unit 24.

In the confirmation operation in FIG. 2(*b*), when deposit of the input banknotes temporarily held in the escrow unit 20 is confirmed, the banknotes are fed out one by one from the escrow unit, and banknotes to be used as change are stored in either one of the circulation-type banknote storage units 30 and 40 by denomination via the stored-banknote transport route 9*b*, and banknotes not to be used as change are stored in the collection box 50.

In the withdrawal operation in FIG. 3(*a*), banknotes stored in the circulation-type banknote storage units 30 and 40 are extracted and recognized in the recognition unit 15 at the time of dispensing the banknote as change, and if the banknote is a banknote capable of being returned, the banknote is once stacked (one to plural sheets) in the payout stacking unit 22, and paid out collectively as change from the return port 7.

On the other hand, when it is judged that the banknote is a banknote that cannot be returned by the recognition of the recognition unit 15, the banknote is temporarily held in the escrow unit 20, and then transferred to the collection box 50 to be stored therein.

In the collection operation in FIG. 3(*b*), the banknotes stored in the circulation-type banknote storage units (circulation-type banknote storage devices) 30 and 40 at the closing time are once stacked in the escrow unit 20, and then stored in the collection box 50.

Drive Transmission Switching Mechanism and Circulation-Type Banknote (Paper Sheet) Storage Unit <Banknote Storage Unit>

Figure 4:
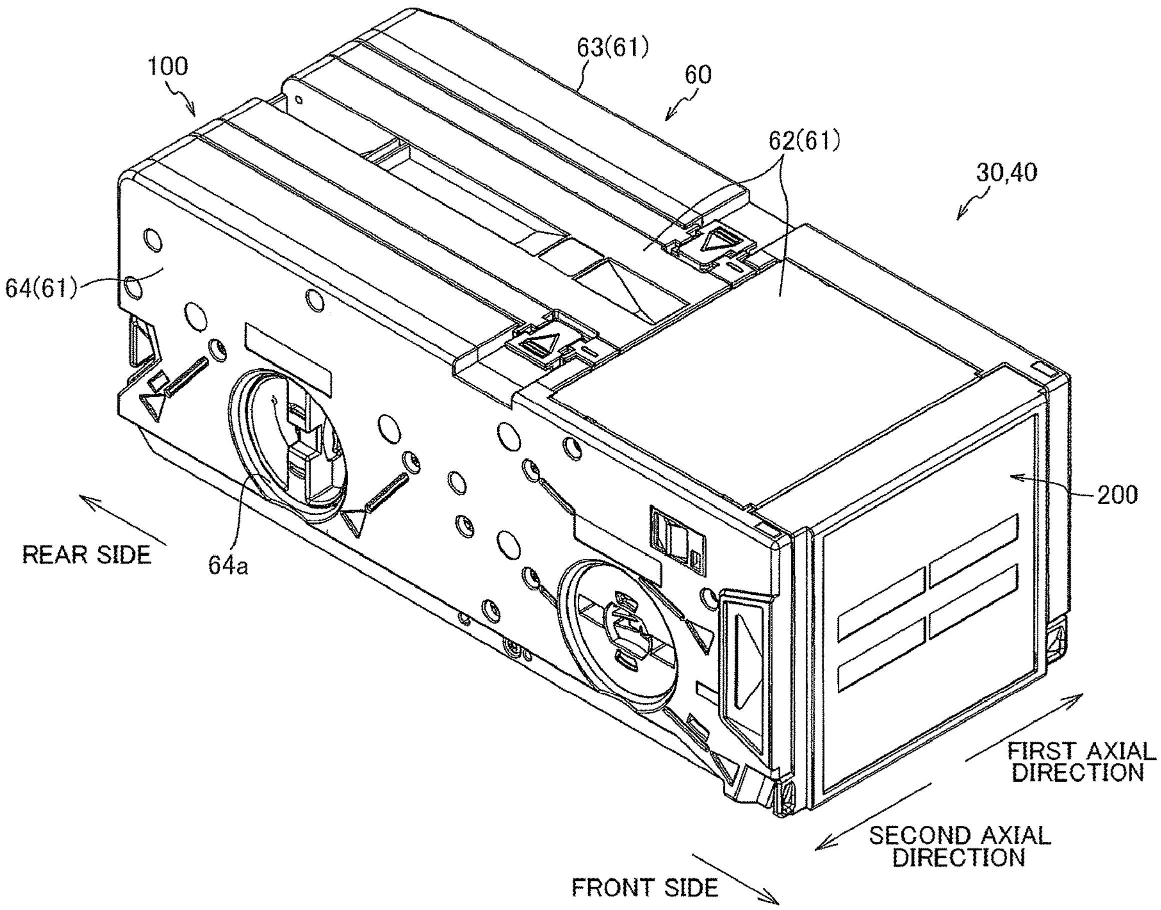
FIG. 4 is an external perspective view of a circulation-type banknote storage unit including the drive transmission switching mechanism according to the embodiment of the present invention.
Figure 5:
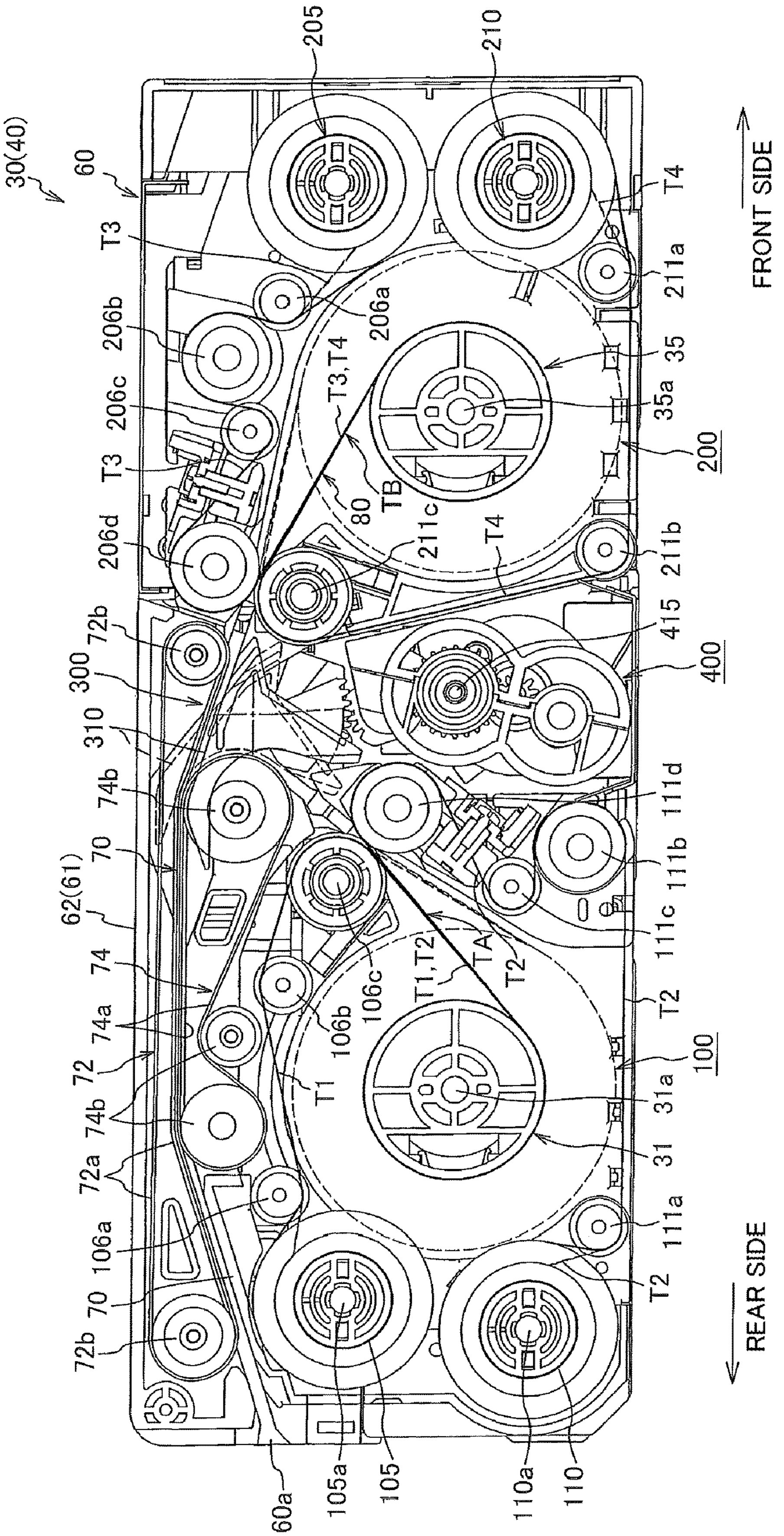
FIG. 5 is a longitudinal sectional view illustrating an inner configuration of the circulation-type banknote storage unit.
Figure 6:
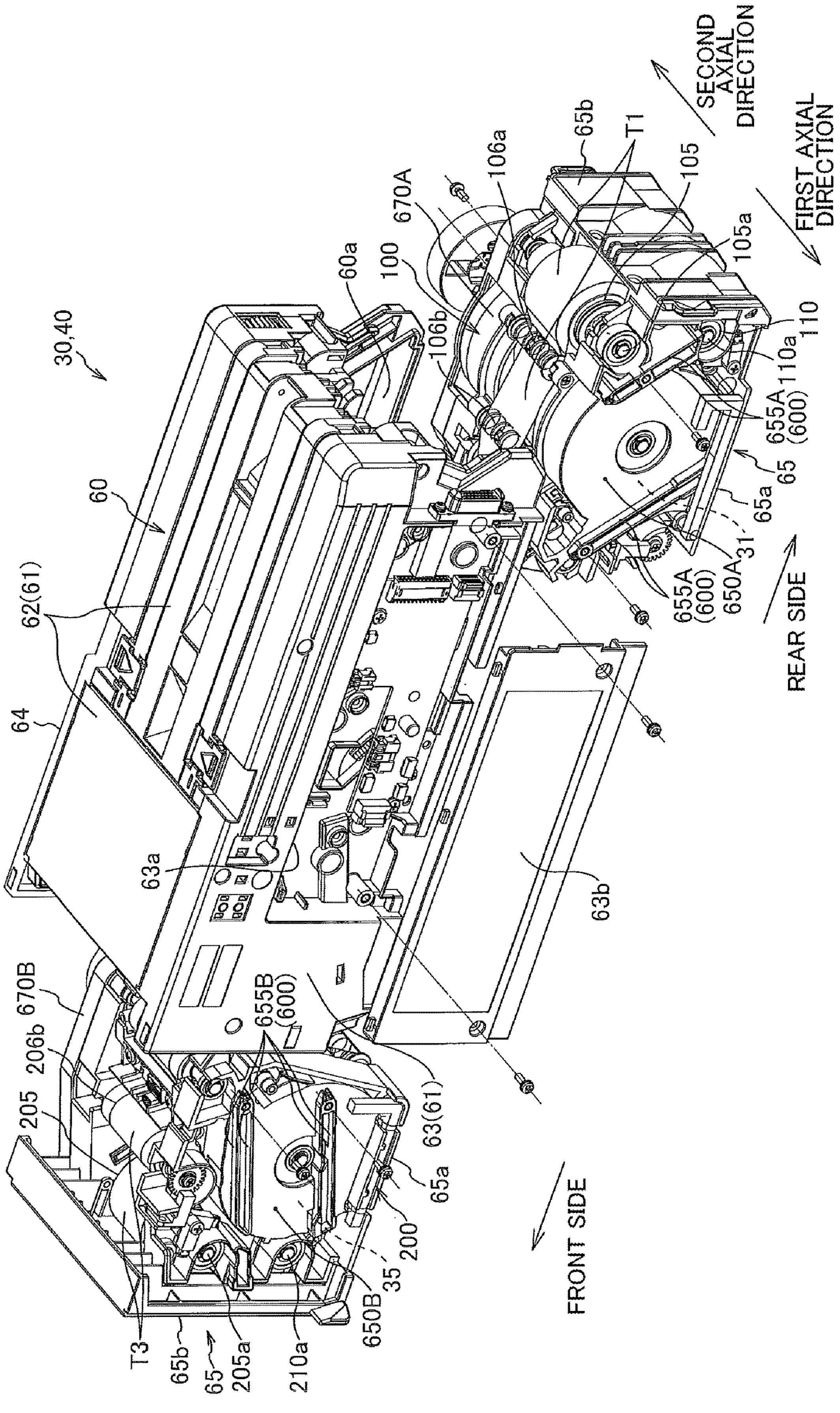
FIG. 6 is an exploded perspective view of the circulation-type banknote storage unit.
Figure 7:
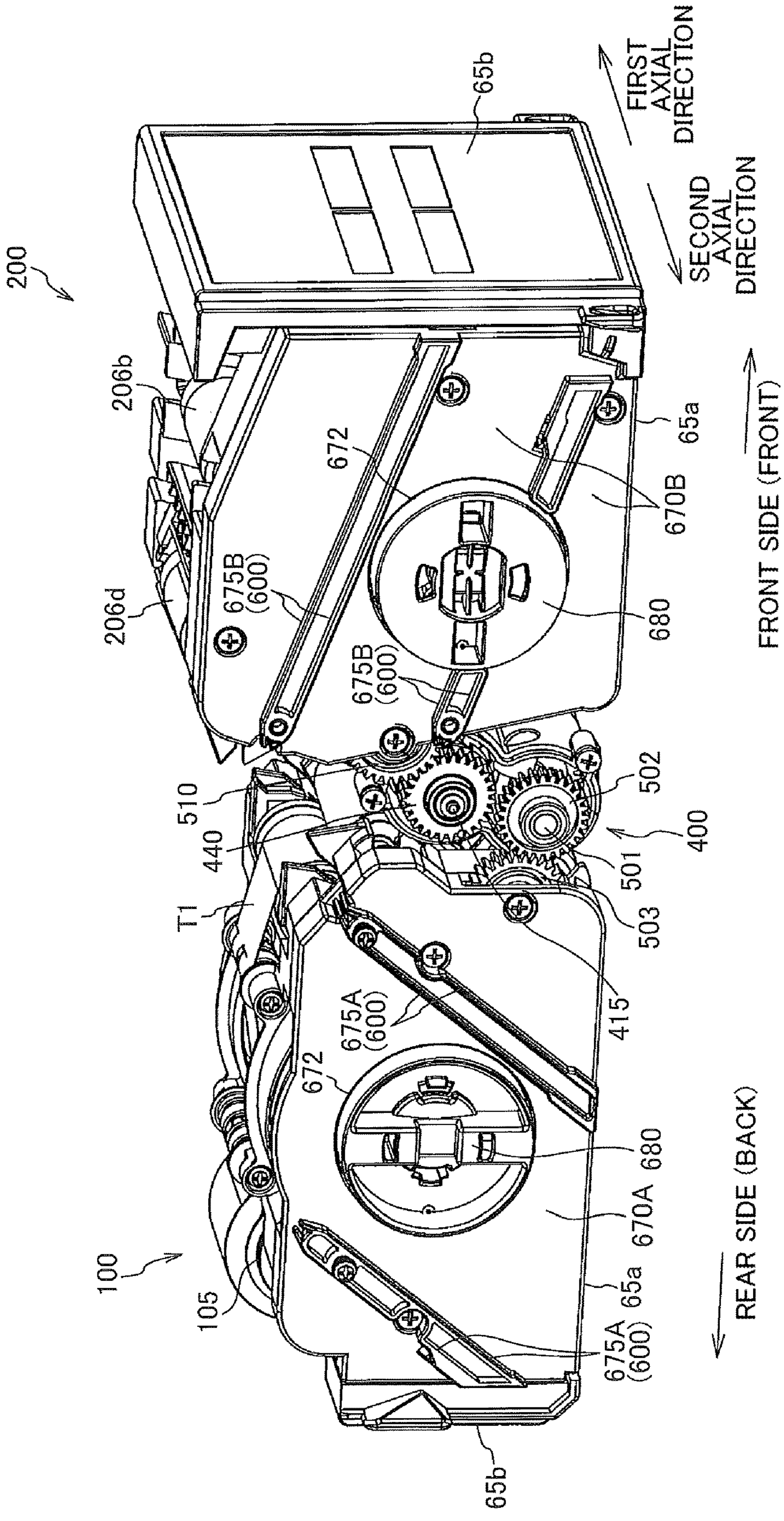
FIG. 7 is a perspective view illustrating an assembly state of two circulation drum units and the drive transmission switching mechanism.
Figure 8:
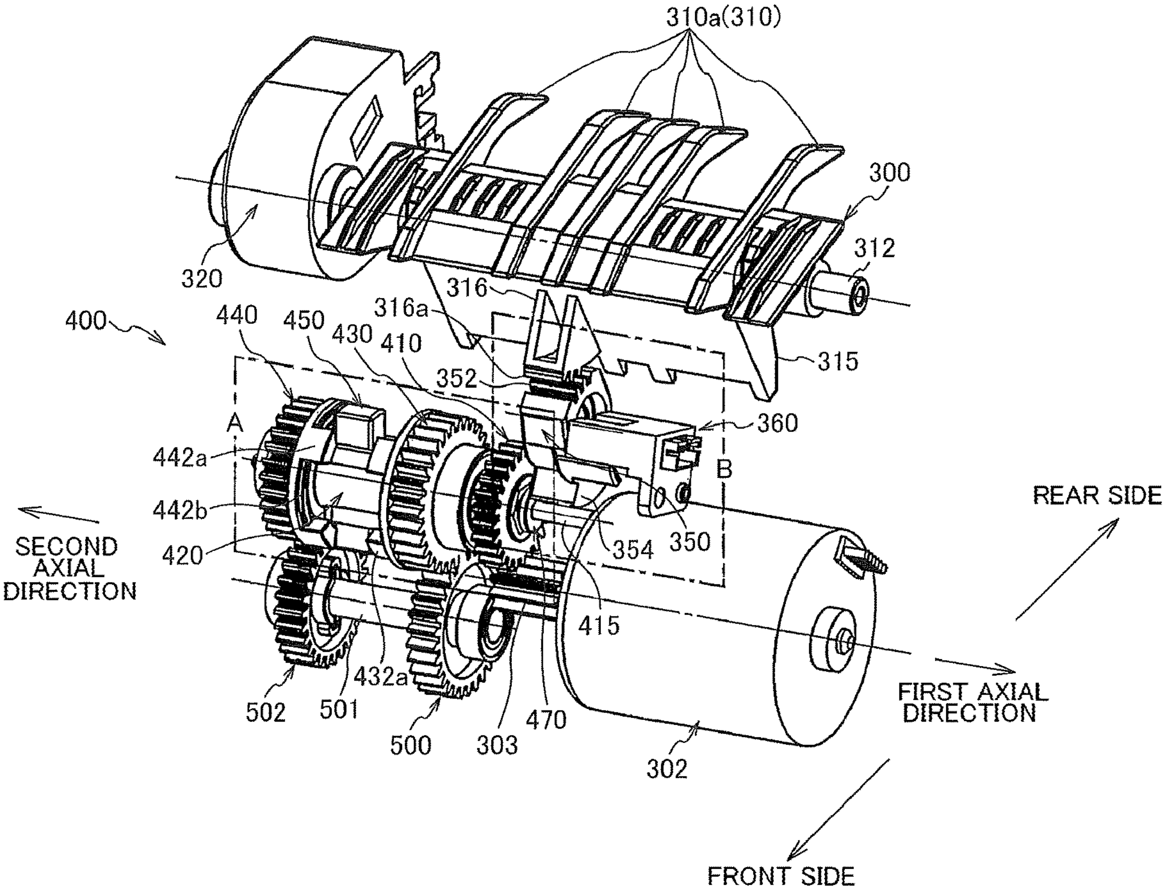
FIG. 8 is an external perspective view of a flapper drive mechanism and the drive transmission switching mechanism.
Figure 9:
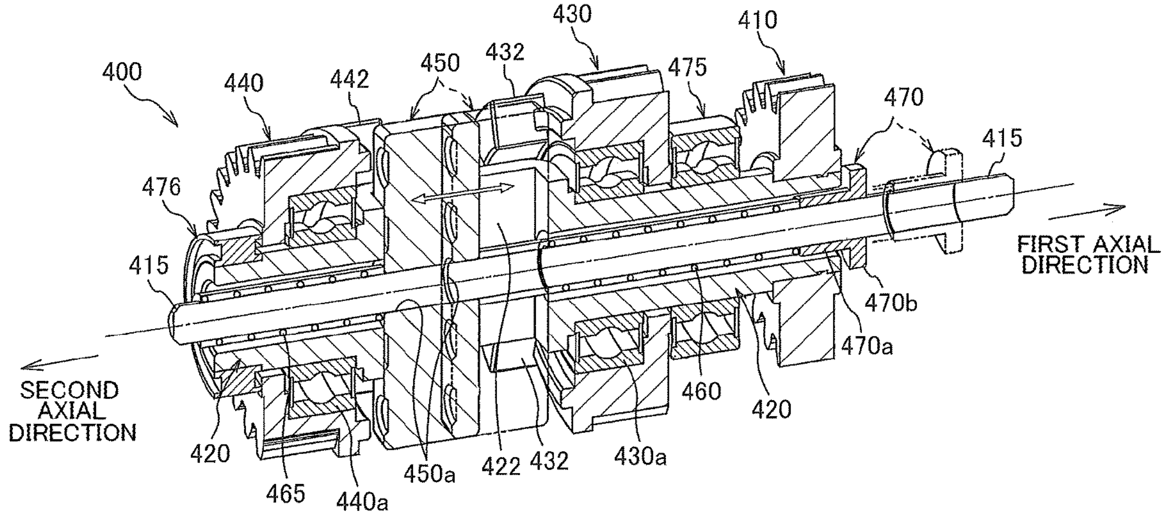
FIG. 9 is a longitudinal sectional view of the drive transmission switching mechanism (a sectional view of a part A in FIG. 8).
Figure 10:
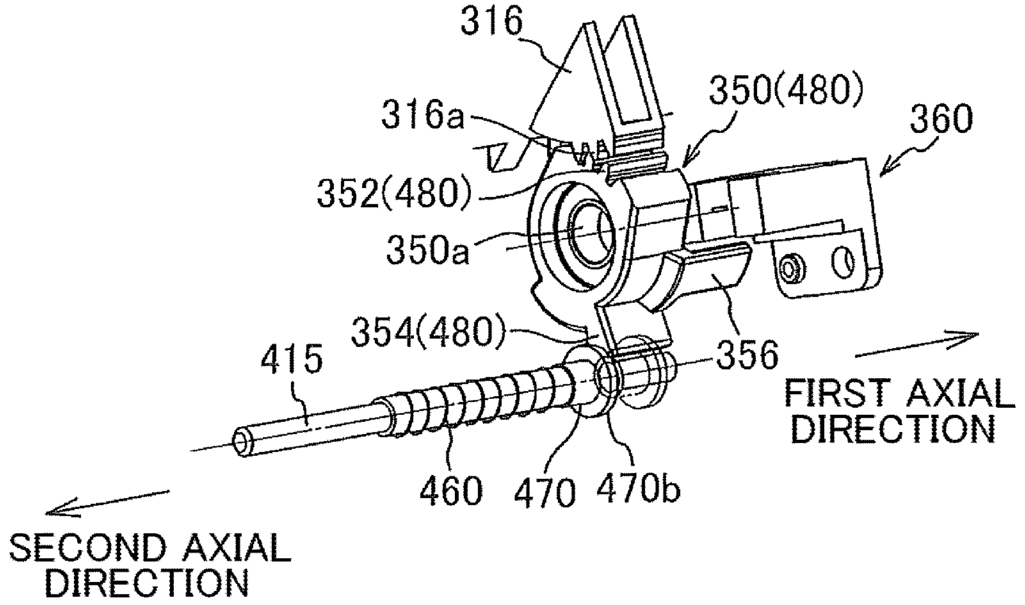
FIG. 10 is a perspective view illustrating an assembly state of a chipped gear member, a cam gear, a pressurizing member, and the like (an enlarged view of a part B in FIG. 8).
Figure 11:
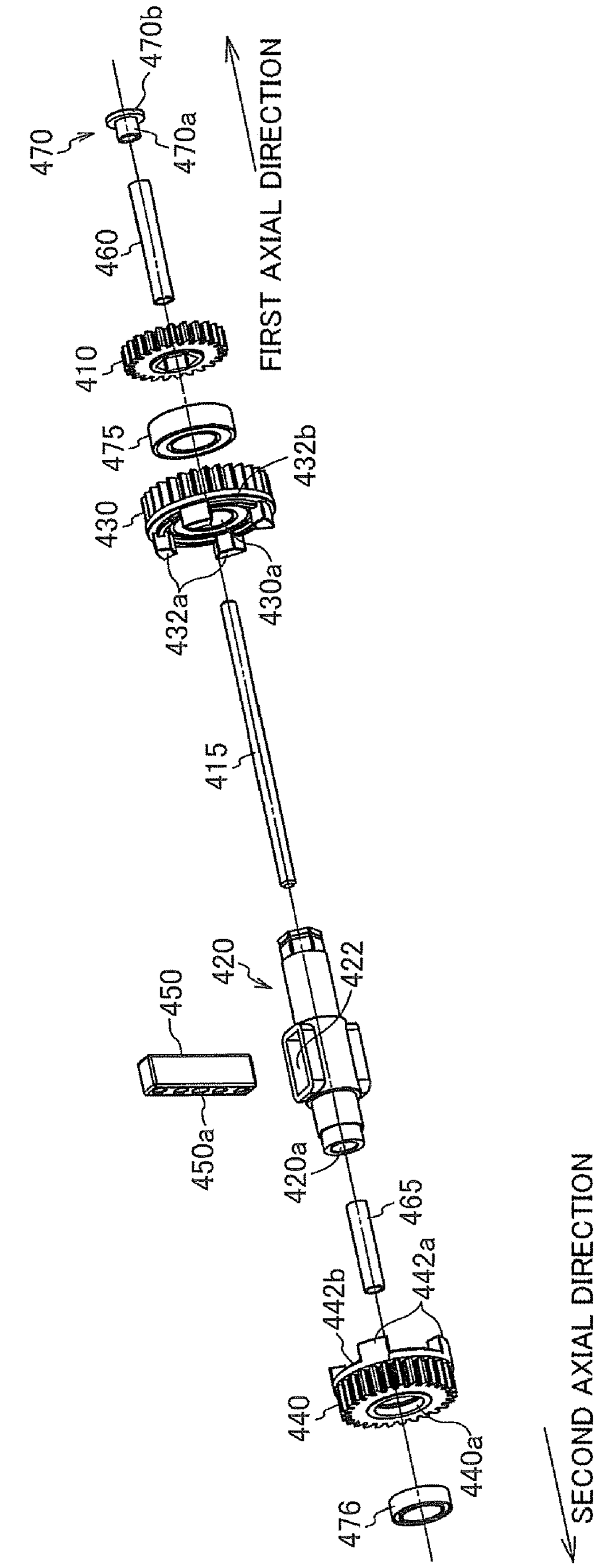
FIG. 11 is an exploded perspective view of the main component of the drive transmission switching mechanism.

FIG. 4 is an external perspective view of the circulation-type banknote storage unit according to the embodiment of the present invention. FIG. 5 is a longitudinal sectional view illustrating an inner configuration of the circulation-type banknote storage unit, and FIG. 6 is an exploded perspective view of the circulation-type banknote storage unit. FIG. 7 is a perspective view illustrating an assembly state of two circulation drum units and the drive transmission switching mechanism. FIG. 8 is an external perspective view of a flapper drive mechanism and the drive transmission switching mechanism. FIG. 9 is a longitudinal sectional view of the drive transmission switching mechanism (a sectional view of a part A in FIG. 8). FIG. 10 is a perspective view illustrating an assembly state of a chipped gear member, a cam gear, a pressurizing member, and the like (an enlarged view of a part B in FIG. 8). FIG. 11 is an exploded perspective view of the main component of the drive transmission switching mechanism. FIGS. 12(*a*-1), (*a*-2), and (*a*-3) and (*b*-1), (*b*-2), and (*b*-3) are explanatory diagrams illustrating a state in which the cam gear activates the pressurizing member.

(Circulation-Type Banknote Storage Unit)

The circulation-type banknote storage units (circulation-type banknote storage devices=banknote storage units) 30 and 40 have a schematic configuration including two circulation drum units 100 and 200 in a casing 60, a flapper drive mechanism 300 that switches the transport route of the banknote (feed route, payout route) to either one of the circulation drum units, and the drive transmission switching mechanism 400 that switches and transmits a drive force from a motor alternatively (selectively) to either one of the circulation drum units, in conjunction with a switching operation of a banknote transport direction by the flapper drive mechanism 300.

The circulation-type paper sheet storage units 30 and 40 according to the present invention include the casing 60, at least one circulation unit 100 or 200 that is accommodated in the casing to receive paper sheets transported into the casing by operating upon reception of a drive force from the motor 302 and feeds paper sheets stored therein to outside of the casing, and a detachable guide mechanism 600 that enables to attach or detach the circulation unit to or from the casing.

Further, the circulation-type paper sheet storage units 30 and 40 include a single motor 302, a first circulation unit (first circulation drum unit) 100 and a second circulation unit (second circulation drum unit) 200 that respectively receive transported paper sheets by operating upon reception of a drive force from the motor and feed paper sheets stored therein, a sorter (flapper) 310 that sorts transported paper sheets to either one of the circulation units by changing a posture (position) thereof, a sorter drive mechanism (flapper drive mechanism) 300 that drives the sorter, and the drive transmission switching mechanism 400 that selectively switches and transmits a drive force from the motor to either one of the circulation units, by operating in conjunction with a sorting operation by the sorter drive mechanism 300. The configuration is characterized such that the drive transmission switching mechanism is activated by changing the posture (transport direction) of the sorter 310 by the sorter drive mechanism, to switch and transmit the drive force from the motor to either one of the circulation units.

The configuration of the circulation-type banknote storage units (circulation-type banknote storage devices) 30 and 40 is described below in detail.

As illustrated in FIG. 6, the casing 60 includes a casing body 61 having a top panel 62 and right and left side plates 63 and 64, and a side plate lid 63*b* attached to an opened portion 63*a* of the side plate 63. The casing 60 is constituted so that the respective circulation drum units 100 and 200 can be attached thereto from each opening portion on a rear side and a front side of the casing body 61. A feed port 60*a* for receiving a banknote transported from the deposit and withdrawal processing unit M toward the banknote storage unit N on the stored-banknote transport routes 9*a* and 9*b* is formed in an upper part of the rear side of the casing 60.

The respective circulation-type banknote storage units 30 and 40 have substantially the same configuration, and thus the circulation-type banknote storage unit 30 is mainly described below. The circulation drum unit is described below as an example of an object to be driven by the motor. However, the object to be driven widely includes not only a circulation unit of a drum and tape type, but also other circulation units.

As illustrated in FIG. 5 and FIG. 7, the flapper drive mechanism 300 and the drive transmission switching mechanism 400 are arranged between the circulation drum units 100 and 200, and it is configured to switch the transmission direction of a drive force from the motor to either one of the circulation units, in conjunction with the switching operation of the transport direction by the flapper.

As illustrated in FIG. 5, the circulation drum unit 100 on the rear side includes a feed route (transport route) 70 formed in an upper part in the casing to transport banknotes fed from the feed port 60*a* into the casing, a transport mechanism 72 (a belt 72*a* and rollers 72*b*) respectively arranged on an upper side and a lower side of the feed route 70, and a transport mechanism (a belt 74*a* and rollers 74*b*). The circulation drum unit 100 also includes a rear-side circulation drum (first circulation drum) 31 that winds tapes (films) T1 and T2 on the rear side around a periphery thereof in an overlapped state on each other at the time of rotation in a clockwise direction by fixing one end of both the tapes T1 and T2, a first bobbin 105 capable of performing forward and reverse rotation to spirally wind (in multiple layers) and hold the first tape T1 to be supplied to the outer periphery of the first circulation drum 31, and guide rollers 106*a* to 106*c* that guide the first tape T1 pulled out from the first bobbin toward the outer periphery of the first circulation drum. The circulation drum unit 100 further includes a second bobbin 110 capable of performing forward and reverse rotation to spirally wind and hold the second tape T2 to be supplied to the outer periphery of the first circulation drum 31, and guide rollers 111*a* to 111*d* that guide the second tape T2 pulled out from the second bobbin toward the outer periphery of the first circulation drum. The respective tapes T1 and T2 are respectively wound around the outer periphery of the first circulation drum through routes along the respective guide rollers 106*a* to 106*c* and 111*a* to 111*d*, and fed from the first circulation drum to the respective bobbins 105 and 110.

The banknotes fed from the feed port 60*a* and transported through the feed route 70 toward the first circulation drum by the transport mechanisms 72 and 74 are fed into a contact travel area TA in which both the tapes T1 and T2 are overlapped on each other and travel, in a nip portion between the guide roller 106*c* and the guide roller 111*d* at the final position, and stacked on the outer periphery of the first circulation drum that rotates in a winding direction (clockwise direction), while being held between the both tapes.

When the banknotes stacked between the tapes on the outer periphery of the first circulation drum 31 are to be discharged one by one to outside of the circulation drum unit 100, by rotating the respective bobbins 105 and 110 in a winding direction (counter-clockwise direction), while rotating the first circulation drum in a feeding direction (counter-clockwise direction), the respective tapes T1 and T2 are fed in a reverse direction in the same route as that at the time of feeding from the respective bobbins 105 and 110 and wound around the respective bobbins, and the banknotes placed between the respective tapes are sequentially fed out from the nip portion to the feed route 70 and the feed port 60*a.*

The final guide roller 106*c* for the first tape T1 and the final guide roller 111*d* for the second tape T2 form the nip portion, and after the nip portion, both the tapes T1 and T2 are wound around the outer periphery of the first circulation drum 31 in an overlapped state on each other. Further, when the flapper (sorter) 310 for switching the transport direction, which is arranged in the banknote transport route at an intermediate position between the both circulation drum units 100 and 200, is in a first posture (at a first position) indicated by a broken line, by guiding the banknote transported in the feed route 70 in the front direction to the nip portion between the final guide roller 106*c* and the final guide roller 111*d,* the banknote is wound around the outer periphery of the first circulation drum 31 rotating in a clockwise direction in a state being placed between the both tapes T1 and T2 in the nip portion.

On the other hand, when the flapper 310 is in a second posture (at a second position) indicated by a solid line, a bifurcation portion from an end portion of the feed route 70 toward a feed route 80 on the front side (to be formed between tapes T3 and T4) is opened. Therefore, the banknote is transported to the feed route 80.

The circulation drum unit 200 on the front side includes the front-side feed route 80 that is continuous from the end portion of the feed route 70 (the contact travel area of the belts 72*a* and 74*a*), the circulation drum (second circulation drum) 35 on the front side that winds the both tapes T3 and T4 in a state overlapped on each other around a periphery thereof at the time of rotating in a clockwise direction by fixing one end of the both tapes T3 and T4 on the front side, a third bobbin 205 capable of performing forward and reverse rotation to wind and hold the third tape T3 to be supplied to the outer periphery of the second circulation drum 35, guide rollers 206*a* to 206*d* that guide the third tape T3 pulled out from the third bobbin toward the outer periphery of the second circulation drum, a second bobbin 210 capable of performing forward and reverse rotation to wind and hold the fourth tape T4 to be supplied to the outer periphery of the second circulation drum 35, and guide rollers 211*a* to 211*c* that guide the fourth tape T4 pulled out from the second bobbin toward the outer periphery of the second circulation drum.

The respective tapes T3 and T4 are wound around the outer periphery of the second circulation drum 35 through routes along the respective guide rollers 206*a* to 206*d* and 211*a* to 211*c,* and fed from the second circulation drum to the respective bobbins 205 and 210.

Banknotes fed from the feed port 60*a* and transported toward the bifurcation portion where the flapper 310 is located, through the feed route 70 by the transport mechanisms 72 and 74 are guided to the feed route (transport route) 80 on the front side, when the flapper is in the second posture indicated by the solid line.

The feed route 80 is a route from the nip portion between the guide roller 206*c* and the guide roller 211*d* at the final positions to the outer periphery of the second circulation drum 35, and is constituted by the contact travel area TB in which the both tapes T3 and T4 overlap on each other and travel. The banknote having passed the bifurcation portion is fed into the feed route 80, and is stacked on the outer periphery of the second circulation drum that rotates in a winding direction (clockwise direction), while being placed between the both tapes.

When the banknotes stacked between the tapes T3 and T4 on the outer periphery of the second circulation drum 35 are to be discharged one by one to outside of the circulation drum unit 100, by rotating the respective bobbins 205 and 210 in a winding direction (counter-clockwise direction), while rotating the second circulation drum in a feeding direction (counter-clockwise direction), the respective tapes T3 and T4 are fed in a reverse direction in the same route as that at the time of feeding from the respective bobbins 205 and 210 and wound around the respective bobbins, and the banknotes placed between the respective tapes are sequentially fed out from the nip portion to the feed routes 80 and 70 and the feed port 60*a*.

The final guide roller 206*d* for the third tape T3 and the final guide roller 211*c* for the fourth tape T4 form the nip portion, and after the nip portion, the both tapes T3 and T4 are wound around the outer periphery of the second circulation drum 35 in an overlapped state on each other. That is, when the flapper 310 for switching the transport direction, which is arranged in the banknote transport route at an intermediate position between the both circulation drum units 100 and 200, is in a second posture indicated by a solid line, by guiding the banknote transported in the feed route 70 to the nip portion between the final guide roller 206*d* and the final guide roller 211*c,* the banknote is wound around the outer periphery of the second circulation drum 35 rotating in a clockwise direction in a state being placed between the both tapes T3 and T4 in the nip portion. When the banknote on the outer periphery of the second circulation drum is to be fed out, reverse feed of the banknote is performed in a state of maintaining the flapper in the second posture.

(Sorter Drive Mechanism)

Next, in an overall external perspective view of the flapper drive mechanism and the drive transmission switching mechanism in FIG. 8, a reference numeral 300 denotes the flapper drive mechanism (sorter drive mechanism) that moves the flapper (sorter) 310 for switching the transport direction rotationally in forward and reverse directions within a predetermined angle range, in the present example, in an angle range of 20 degrees. The flapper 310 includes a plurality of claws 310*a* fixed to a pivot shaft 312 and integrally move rotationally together with the pivot shaft. The claws enter into a gap between the respective transport belts 72*a* and 74*a* constituted by a plurality of belts arranged in parallel with a predetermined gap, thereby enabling to change the posture between the first posture and the second posture and switch the transport direction of the banknote.

The pivot shaft 312 is supported by a swing solenoid 320 at one end to move the flapper 310 rotationally. On one surface of a protruding piece 315 protruding to an opposite side to the flapper 310, placing the pivot shaft 312 therebetween, a clutch activating piece (chipped gear member) 316 having sides each formed by a triangular plate material is provided in a protruding manner, and a gear portion 316*a* having a small number of gear threads is formed on a lower surface of the clutch activating piece.

As illustrated in a relevant-part enlarged diagram in FIG. 10, immediately below the clutch activating piece 316, a cam gear 350 that moves rotationally around a shaft portion 350*a* parallel to the pivot shaft 312 of the flapper is arranged so as to be able to move rotationally. The cam gear 350 includes a driven gear portion 352 that engages with the gear portion 316*a* of the clutch activating piece, a cam portion 354, and a douser 356 on the periphery thereof. Since the flapper 310 moves rotationally by the swing solenoid 320, the drive force is transmitted from the gear portion 316*a* of the clutch activating piece to the driven gear portion 352, and the cam gear 350 moves rotationally. The cam portion 354 provided in a protruding manner on the opposite side to the driven gear portion 352 moves rotationally in forward and reverse directions to advance and retreat a pressurizing member 470 described later in an axial direction, thereby switching the transmission direction of the drive force by the drive transmission switching mechanism 400 to the rear-side circulation drum unit 100 and the front-side circulation drum unit 200 alternately.

The douser 356 advances and retreats between a light-emitting element and a light-receiving element constituting a route-switching detection sensor 360 formed of a photo interrupter, and when located between these elements, transmits a signal indicating that the flapper is at a home position (at a first axial position) to a control unit. In the state in FIG. 10, since the flapper and the cam portion 354 are in the second posture, the douser 356 is not located between the elements, and the pressurizing member 470 is at a second axial position indicated by a solid line. When the flapper moves rotationally to shift to the first posture and the cam portion 354 moves rotationally from the posture in FIG. 10 by a predetermined angle in a counter-clockwise direction, the douser enters into between the elements to become a light-shielded state. Therefore, the pressurizing member moves to the first axial position indicated by a chain line.

The control unit can confirm in which state of the first posture and the second posture the flapper 310 is, by detecting the posture of the cam gear 350 by the route-switching detection sensor 360.

(Drive Transmission Switching Mechanism)

The drive transmission switching mechanism 400 is a unit that switches and transmits a drive force from a single motor 302 alternatively (selectively) to either one of the circulation drum unit (first load) 100 on the rear side and the circulation drum unit (second load) 200 on the front side. The respective circulation drum units include a drive mechanism formed of a gear and the like, and by activating the respective drive mechanisms by the drive force from the drive transmission switching mechanism 400, the circulation drums, the bobbins, and the transport mechanisms are rotated by the single motor, thereby realizing winding and feed of the banknote.

The drive transmission switching mechanism 400 operates in conjunction with the flapper drive mechanism 300, and when the flapper (sorter) 310 is closing the front-side feed route 80, transmits the drive force from the motor 302 only to the circulation drum unit (first load) 100 on the rear side, and when the flapper 310 is opening the front-side feed route 80, transmits the drive force from the motor 302 only to the circulation drum unit (second load) 200 on the front side.

As illustrated in FIG. 8, FIG. 9, and FIG. 11, the drive transmission switching mechanism 400 includes a main drive gear 410 driven to be rotated upon reception of a drive force from an output gear 303 of the motor 302, a fixed shaft 415 that does not rotate and pivotally supports a shaft hole of the main drive gear so as to be able to rotate via a rotary sleeve 420, and the rotary sleeve 420 being a long cylindrical body that is supported immovably in an axial direction but so as to be able to rotate relative to an outer periphery of a fixed shaft inserted into a central hole 420$a$ penetrating in an axial direction, and fixedly supports a shaft hole of the main drive gear 410. The drive transmission switching mechanism 400 further includes a first transmission gear 430 in which a shaft hole (a shaft core, a bearing member 430$a$) is pivotally supported so as to be able to rotate relative to an outer periphery of the rotary sleeve 420 on the second axial direction side (the left side in each drawing) of the main drive gear 410, to transmit the drive force to the circulation drum unit 100 (first load) side on the rear side, a second transmission gear 440 in which a shaft hole (a bearing member 440$a$) is pivotally supported so as to be able to rotate relative to an outer periphery of the rotary sleeve 420 on the second axial direction side of the first transmission gear, to transmit the drive force to the circulation drum unit 200 (second load) side on the front side, and first dog teeth 432 and second dog teeth 442 provided on opposite surfaces of the first transmission gear 430 and the second transmission gear 440.

The respective dog teeth 432 and 442 are respectively constituted by peaks 432$a$ and 442$a$, and valleys 432$b$ and 442$b$.

Further, the drive transmission switching mechanism 400 includes a dog clutch key 450 that is supported axially movably by a movable support hole 422 provided in a rotary sleeve portion located between the first transmission gear 430 and the second transmission gear 440 and meshes with the first dog teeth 432 when located at a position biased toward the first axial direction, and meshes with the second dog teeth 442 when located at a position biased toward the second axial direction. The drive transmission switching mechanism 400 also includes a first coil spring (first resilient member) 460 constituted by a compression spring arranged between an outer periphery of the fixed shaft 415 and an inner periphery of the central hole 420$a$ of the rotary sleeve 420 at a position closer to the first transmission gear 430 than the dog clutch key (first axial direction side), and a second coil spring (second resilient member) 465 constituted by a compression spring arranged between the outer periphery of the fixed shaft 415 and the inner periphery of the central hole 420$a$ of the rotary sleeve at a position closer to the second transmission gear 440 than the dog clutch key (second axial direction side). The drive transmission switching mechanism 400 further includes the pressurizing member (slide bush) 470 inserted into a gap between the outer periphery of the fixed shaft and the central hole 420$a$ of the rotary sleeve from an end on the second axial direction side to pressurize the dog clutch key 450 toward the second transmission gear 440 via the first coil spring.

It is set that the resilience (spring load) of the second coil spring 465 becomes larger than that of the first coil spring 460. Since the second coil spring 465 is configured not to move in the second axial direction by being locked by a locking unit (not illustrated) at the end on the second axial direction side, the second coil spring 465 is reliably compressed at the time of being pressurized in the second axial direction by the dog clutch key. Further, an axial length and an arrangement position of the first coil spring are set so as not to block the behavior of the dog clutch key, as indicated by a chain line in FIG. 9, when the second coil spring shifts the dog clutch key 450 to an end in the first axial direction in the movable support hole. Meanwhile, the axial length and the resilience of the first coil spring are set so that the first coil spring can cause the dog clutch key to mesh with the second dog teeth 442 of the second transmission gear, while sufficiently compressing the second coil spring via the dog clutch key, when the pressuring member compresses the first coil spring in the second axial direction.

When the pressuring member 470 is not pressing the first coil spring 460 or is pressing the first coil spring 460 with a weaker force than a predetermined value, the dog clutch key 450 is pressed in the first axial direction by the second coil spring 465, so as to be meshed with the first dog teeth (valleys) of the first transmission gear 430, thereby transmitting the drive force from the main drive gear 410 to the circulation drum unit 100 on the rear side. Further, when the flapper drive mechanism 300 operates to activate the activation mechanism (the cam gear 350), so that the pressurizing member 470 presses the first coil spring 460 in the second axial direction with a force equal to or larger than a predetermined value, the dog clutch key 450 moves in the second axial direction so as to be meshed with the second dog teeth 442 (valleys) of the second transmission gear 440, thereby transmitting the drive force from the main drive gear 410 to the circulation drum unit (second load) 200 on the front side.

The dog clutch key 450 moves axially to be meshed alternately with the respective valleys 432*b* and 442*b* of the first dog teeth 432 and the second dog teeth 442 provided on faces opposite to each other of the first transmission gear 430 and the second transmission gear 440, thereby enabling switching transmission of the drive force, by alternately integrating the respective transmission gears with the main drive gear 410.

That is, the dog clutch key 450 is substantially in a rectangular shape, is fitted into the movable support hole 422, which is a long through hole provided in the rotary sleeve, in such a manner that the opposite ends thereof protrude from the movable support hole, and is supported movably in an axial direction. An insertion hole 450*a* for inserting the fixed shaft 415 so as to be able to move relatively is formed penetrating therethrough in an intermediate part between two opposite end faces of the dog clutch key 450. By inserting the fixed shaft 415 into the insertion hole 450*a,* the dog clutch key 450 can advance and retreat in the movable support hole 422 in the same posture. That is, since the dog clutch key axially moves along the movable support hole 422, while the posture thereof is steadily guided by the fixed shaft, the dog clutch key can smoothly mesh with the respective dog teeth.

While the main drive gear 410 is fixed to an outer periphery of the rotary sleeve 420 at a first axial end, the first transmission gear 430 is pivotally supported so as to be able to rotate relative to the outer periphery of the rotary sleeve 420 via the bearing member 430*a*. Further, the second transmission gear 440 is pivotally supported so as to be able to rotate relative to the outer periphery of the rotary sleeve on the second axial direction side via the bearing member 440*a*.

The rotary sleeve 420 is pivotally supported rotatably at the axial opposite ends by bearing members 475 and 476. The bearing members 475 and 476 are supported by a fixing portion (not illustrated).

As illustrated in FIG. 8, the first transmission gear 430 meshes with one rear-side driven gear 500 located immediately below thereof, to drive another rear-side driven gear 502 integrated therewith via a rear-side drive shaft 501. The rear-side driven gear 502 meshes with another rear-side driven gear 503 illustrated in FIG. 7, to drive an object to be driven in the rear-side circulation drum unit 100.

The second transmission gear 440 meshes with another front-side driven gear 510 illustrated in FIG. 7, to drive an object to be driven in the front-side circulation drum unit 200.

(Activation Mechanism)

Next, a configuration and operations of an activation mechanism 480 that causes the respective transmission gears 430 and 440 to connect with and disconnect from the main drive gear 410, which is directly connected with the motor 302, by the flapper drive mechanism 300 that advances and retreats the pressurizing member 470 to axially move the dog clutch key 450 are described with reference to FIG. 10 and FIG. 12.

That is, the activation mechanism 480 that activates the pressurizing member 470 supported by the fixed shaft 415 so as to be able to advance and retreat axially includes a driven gear portion 352 that is moved rotationally by the pivot shaft 350*a* parallel to the fixed shaft 415 and receives a drive force from the other drive gear portion (in this example, the gear portion 316*a* of the clutch activating piece 316) in a part of the outer periphery, and the cam gear 350 including the cam portion 354, which comes into contact with and activates a cam follower 470*b* provided in the pressurizing member 470, in the other part of the outer periphery. The activation mechanism 480 is characterized such that the cam portion 354 has a shape that axially advances and retreats the cam follower 470*b* in a process in which the cam gear 350 moves rotationally in forward and reverse directions.

FIGS. 12(*a*-1), (*a*-2), and (*a*-3) illustrate a state in which the cam gear 350 (the cam portion 354) is not pressing the pressurizing member 470 because it is in the first posture (a drive force transmission state to the circulation drum unit 100 on the rear side), and FIGS. 12(*b*-1), (*b*-2), and (*b*-3) illustrate a state in which the cam portion 354 is pressing the pressurizing member 470 in the second axial direction because it is in the second posture (a drive force transmission state to the circulation drum unit 200 on the front side).

The pressurizing member (slide bush) 470 is constituted by a cylindrical portion 470*a* inserted into the fixed shaft 415 and a flange (cam follower) 470*b* provided at one end of the cylindrical portion.

The cam portion 354 provided in the cam gear 350 includes a cam surface 354*a* as an inclined surface having a predetermined inclination with respect to the axial direction of the fixed shaft. The cam surface 354*a* has a positional relationship in which the cam surface 354*a* comes in sliding contact with an outer peripheral edge of the flange 470*b* of the pressuring member 470, and the cam surface 354*a* generates a force to cause the pressuring member to advance or retreat axially via the flange, by pressing or releasing pressure against the flange 470*b* in the process in which the cam gear 350 moves rotationally in forward and reverse directions.

In the state illustrated in FIGS. 12(*a*-1) to (*a*-3), since the cam portion 354 is in the first posture, the cam surface 354*a* does not press the flange 470*b* in the second axial direction, and thus the pressurizing member stops at a position biased toward the first axial direction. Therefore, the first coil spring 460 does not move the dog clutch key 450 in the second axial direction, and the dog clutch key 450 stops at a position biased toward the first axial direction by the second coil spring 465. Accordingly, the dog clutch key can maintain the state meshed with the first dog teeth 432 of the first transmission gear 430 on the rear side.

Since the dog clutch key drives the motor in the state being meshed with the first dog teeth, a drive force is transmitted from the output gear 303 through the main drive gear 410, the rotary sleeve 420, the dog clutch key 450, and the first transmission gear 430. During the rotation, the first and second coil springs do not rotate, or follow the rotation of the rotary sleeve.

In this example, when the cam portion 354 is in the first posture, the pressurizing member does not pressurize the first coil spring at all. However, the pressurizing member may come into contact with the first coil spring or apply pressure lightly to the first coil spring so as not affect the movement of the dog clutch key.

In the state illustrated in FIGS. 12(*b*-1) to (*b*-3), since the cam portion 354 is in the second posture, the cam surface 354*a* presses the flange 470*b* in the second axial direction, and thus the pressurizing member moves in the second axial direction against the first coil spring 460 (while compressing the first coil spring). Therefore, the first coil spring 460 moves the dog clutch key 450 in the second axial direction against the second coil spring 465, and the dog clutch key can maintain the state meshed with the second dog teeth 442 of the second transmission gear 440 on the front side.

Since the dog clutch key drives the motor in the state being meshed with the second dog teeth, a drive force is transmitted from the output gear 303 through the main drive gear 410, the rotary sleeve 420, the dog clutch key 450, and the second transmission gear 440. During the rotation, the first and second coil springs do not rotate, or follow the rotation of the rotary sleeve. In any case, the respective coil springs do not block transmission of a drive force during a period in which the drive force from the motor is being transmitted to either one of the transmission gears.

According to the present embodiment, since the swing solenoid 320 causes the flapper 310 to move rotationally between the first posture indicated by a broken line and the second posture indicated by a solid line in FIG. 5, the pressuring member 470 advances and retreats between a non-pressing position indicated by a solid line in FIG. 9 (FIGS. 12(*a*-1 ) to 12(*a*-3)) and a pressing position indicated by a broken line in FIG. 9 (FIGS. 12(*b*-1) to (*b*-3)). Since the flapper is an essential component as a transport-direction switching unit of banknotes in a two drum-type banknote storage device, reduction in the number of components, downsizing, and low cost can be realized by also using the operation of the essential component also as means for switching a drive force.

(Measures Against Meshing Failure)

A force for meshing the dog clutch key 450 with the respective dog teeth is basically a pressure from the respective coil springs. However, if the resilience of the respective coil springs decreases due to an increase of sliding resistance of the respective coil springs by wear between the central hole 420*a* of the rotary sleeve and the coil springs over time, the pressure for achieving mesh becomes insufficient, and friction and catch between the dog clutch key and peaks of the respective dog teeth cannot be resolved and the dog clutch key cannot mesh with the respective dog teeth. That is, in the process in which the dog clutch key 450 advances and retreats in the movable support hole 422 in line with the advance and retreat of the pressurizing member 470, such a situation may occur that the dog clutch key 450 collides with the peaks 432*a* or 442*a* of the dog teeth of either one of the transmission gears 430 and 440, and cannot enter into the valleys 432*b* or 442*b*.

In the present invention, the dog clutch key 450 can rotate relative to the peaks of the respective dog teeth at the timing of initial motion, by driving the motor 302 while maintaining (locking) the posture of the flapper 310 (clutch activating piece 316) so as not to move rotationally, with the swing solenoid 320 being kept in a biased state, thereby enabling to cause the dog clutch key to fall into any of the valleys 432*b* and 442*b* immediately.

That is, when the clutch activating piece 316 holds the cam gear 350 in the first posture illustrated in FIG. 12(*a*-1) and the like, the cam portion 354 does not press the flange 470*b* and holds the pressurizing member on the first axial direction side. In this state, since the dog clutch key 450 is displaced in the first axial direction within the movable support hole 422 by the force of the second coil spring 465, the dog clutch key 450 is located on the side of the first transmission gear 430. In this stage, even if the dog clutch key 450 collides with the peaks 432*a* of the dog teeth of the first transmission gear 430 to cause friction and catch so as not to be able to fall into the valleys 432*b*, by driving the motor 302 while maintaining the cam gear 350 in the first posture, the dog clutch key 450 is rotated by the drive force. Therefore, the dog clutch key 450 can fall into the valleys 432*b* immediately, thereby preventing that the poor meshing state continues.

Further, when the clutch activating piece 316 holds the cam gear 350 in the second posture illustrated in FIG. 12(*b*-1) and the like, the cam portion 354 presses the flange 470*b* to move the pressurizing member to the second axial direction side. In this state, since the dog clutch key 450 is displaced in the second axial direction within the movable support hole 422 by the force of the first coil spring 460, the dog clutch key 450 is located on the side of the second transmission gear 440. In this stage, even if the dog clutch key 450 collides with the peaks 442*a* of the second dog teeth of the second transmission gear 440 so as not to be able to fall into the valleys 442*b*, by driving the motor while maintaining the cam gear 350 in the second posture, the dog clutch key 450 is rotated by the drive force. Therefore, the dog clutch key 450 can fall into the valleys 442*b* immediately.

In this manner, even if the resilience of the respective coil springs decreases due to an increase of sliding resistance of the respective coil springs by wear between the central hole 420*a* of the rotary sleeve and the coil springs over time, to decrease the force of pressing the dog clutch key against the dog teeth 432 or 442 of respective transmission gears, by continuously pressing the dog clutch key against the dog teeth 432 or 442 of each transmission gear while maintaining the posture of the cam gear 350 in a state in which the swing solenoid is biased continuously, the dog clutch key can fit into the valleys 432*b* or 442*b* together with the rotation of the respective transmission gears, thereby enabling to prevent the dog clutch key from detaching from the respective valleys.

If it is prevented that the force of pressing the dog clutch key against the dog teeth of the respective transmission gears decreases over time by improving the spring load of the coil springs, the resilience of the coil springs excessively increases so that the cam gear 350 constituting the activation mechanism is returned in a reverse direction to change the posture of the flapper, or causes a problem such that malfunction is caused due to insufficient torque of the swing solenoid. Therefore, it is not a favorable idea.

According to the present invention, even if a spring load of the coil spring decreases, mesh between the dog clutch key and the respective dog teeth can be achieved smoothly by continuously biasing the swing solenoid to lock the state of the activation mechanism in a predetermined state continuously, without increasing the spring load of the coil spring.

(Drive Mechanism of Circulation Drum Unit)

A configuration of the drive mechanism that realizes the above operation of the circulation drum and the bobbin in the circulation drum units 100 and 200 is described. Since the configuration of the circulation drum units 100 and 200 are the same (substantially bilaterally symmetrical), only the first circulation drum unit 100 is described here.

Figure 13:
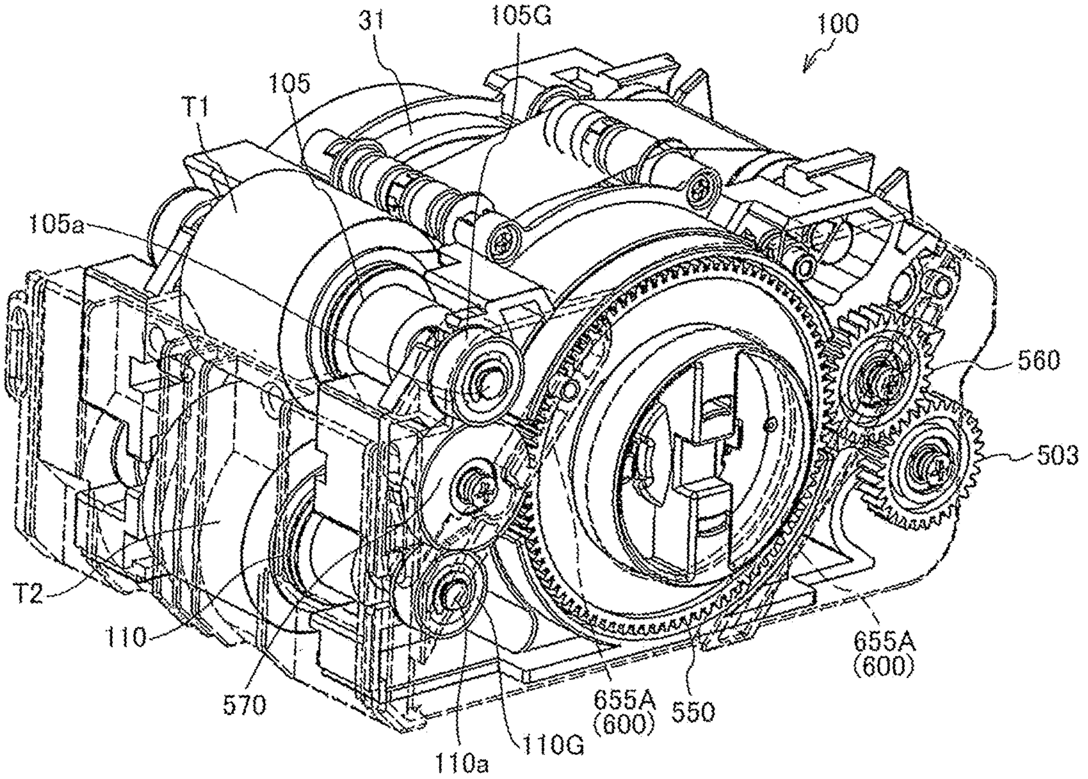
FIG. 13 is a perspective view of a first circulation drum unit including a gear train that drives a circulation drum and respective bobbins.

FIG. 13 is a perspective view of the first circulation drum unit 100 including a gear train that drives the circulation drum 31 and the respective bobbins 105 and 110.

A drum gear 550 having a large diameter is coaxially integrated with one side surface of the circulation drum 31, and the rear-side driven gear 503 illustrated in FIG. 7 transmits a drive force to the drive gear 550 via a driven gear 560.

Each of bobbin gears 105G and 110G is pivotally supported at ends of rotation shafts 105*a* and 110*a* of the first bobbin 105 and the second bobbin 110 via a one-way clutch (not illustrated), and a relay gear 570 that is meshed with the drum gear 550 at all times meshes with the both bobbin gears 105G and 110G at all times. When the drum gear 550 rotates in a clockwise direction for winding the both tapes T1 and T2 with respect to the respective bobbin gears coupled with the rotation shafts 105*a* and 110*a* of the respective bobbins via the one-way clutch, drive from the first bobbin gear 105 and the second bobbin gear 110 is not transmitted to the respective rotation shafts 105*a* and 110*a* (respective bobbins) due to the action of the one-way clutch. That is, when the respective tapes are to be pulled out by rotating the circulation drum 31 in a winding direction, pullout of the tapes is permitted, while the respective bobbins 105 and 110 in a free state rotate together with the tapes.

Further, when the drum gear 550 rotates in a counterclockwise direction for feeding the both tapes T1 and T2, drive from the first bobbin gear 105 and the second bobbin gear 110 is transmitted to the respective rotation shafts 105*a* and 110*a* (respective bobbins) due to the action of the one-way clutch. That is, when the respective tapes are to be fed out by rotating the circulation drum 31 in a feeding direction, the bobbins 105 and 110 are driven in a winding direction by the respective bobbin gears, to wind the tapes.

Detailed configurations other than those described above, for example, a configuration for preventing deflection of a tape is not relevant to the main subject of the present invention, and thus descriptions thereof are omitted.

<Storage and Payout Procedures by Circulation-Type Banknote Processing Device>

Figure 14:
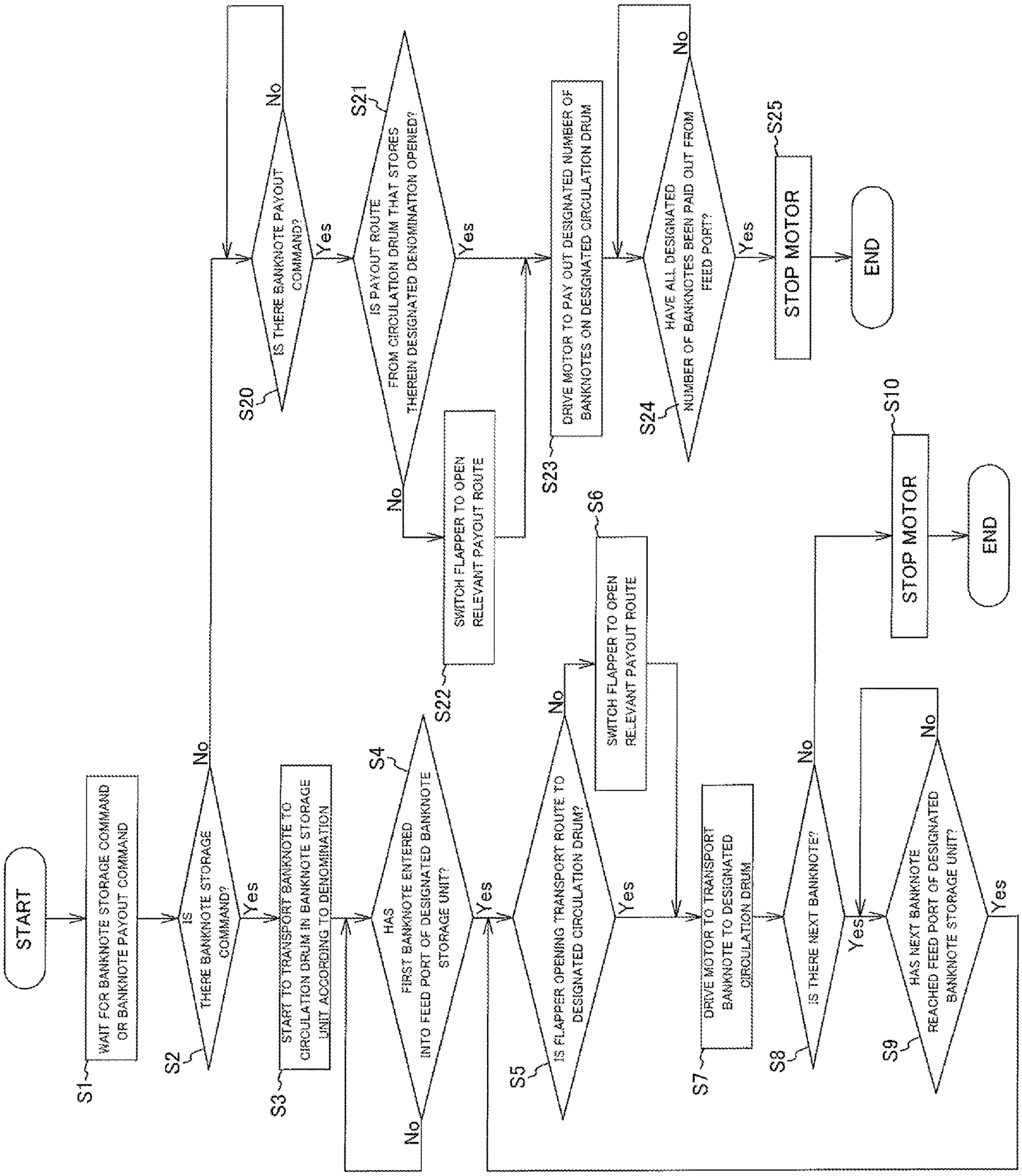
FIG. 14 is a flowchart of storage and payout procedures by the circulation-type banknote processing device.

Next, storage and payout procedures by the circulation-type banknote processing device are described with reference to a flowchart in FIG. 14.

In the flowchart, it is assumed that there is a space for storing a new banknote in all the circulation drums at the time of storing the banknotes, and a necessary number of banknotes of a designated denomination are stored in all the circulation drums at the time of paying out the banknotes. Further, the denomination of the banknote to be stored in each of the circulation drums is determined beforehand, and pieces of information relating to, for example, the denomination and the number of banknotes, and the circulation drum to store the banknotes are included in a banknote storage command from the control unit. Further, pieces of information relating to, for example, the denomination and the number of banknotes to be paid out, and the circulation drum to pay out the banknotes are included in a banknote payout command.

At Step S1, the circulation-type banknote storage unit waits for a banknote storage command or a banknote payout command. When an acceptance condition is satisfied such that a first banknote input from the input/output port 5 illustrated in FIG. 1 by a customer is authentic, the control unit outputs a banknote storage command, designates a circulation drum corresponding to the denomination of the first banknote, for example, the first circulation drum 31, and transports the banknote from the deposit and withdrawal processing unit M toward the banknote storage unit N by driving the transport mechanism (YES at Step S2, and Step S3).

Next, when a paper feed sensor (not illustrated) arranged in the feed port 60*a* of the circulation-type banknote storage unit 30 installed with the first circulation drum 31 detects entrance of the first banknote (YES at Step S4), the control unit confirms whether the flapper 310 is in the first posture in which a route advancing toward the first circulation drum 31 is opened based on an output of the detection sensor 360 at Step S5. When the flapper 310 is in the first posture (YES at Step S5), the control unit drives the motor 302 in a normal rotation direction to rotate the first circulation drum 31 in a winding direction, and rotates the respective bobbins 105 and 110 in a feeding direction, thereby stacking the first banknote on the outer periphery of the first circulation drum while placing the first banknote between the tapes T1 and T2 (Step S7).

When the flapper 310 is in the first posture, since the clutch activating piece 316 integrated with the flapper holds the cam gear 350 in the first posture by the swing solenoid 320, the pressuring member 470 is at a non-pressurizing position illustrated in FIG. 12(*a*) and at a non-pressurizing position indicated by a broken line in FIG. 9 and FIG. 10, and the dog clutch key 450 meshes with the first dog teeth of the first transmission gear 430. Therefore, a drive force from the motor 302 is transmitted to the first circulation drum unit 100 (the drive mechanism of the first circulation drum 31) via the first transmission gear 430.

At Step S5, when the flapper is not in the first posture, the control unit activates the flapper drive mechanism 300 to move the flapper rotationally from the second posture to the first posture (Step S6). It is judged that the flapper is switched to the first posture by an output of the detection sensor 360.

In a case in which the second circulation drum 35 is designated as a storage destination in the banknote storage command output at Step S2, when the paper feed sensor arranged in the feed port 60*a* of the circulation-type banknote storage unit 30 installed with the second circulation drum 35 has detected entrance of the first banknote (YES at Step S4), it is confirmed whether the flapper 310 is in the second posture in which a route advancing toward the second circulation drum 35 is opened at Step S5. When the flapper 310 is in the second posture, the control unit drives the motor 302 in a normal rotation direction to rotate the second circulation drum 35 in a winding direction, and rotates the respective bobbins 205 and 210 in a feeding direction, thereby stacking the first banknote on the outer periphery of the second circulation drum while placing the first banknote between the tapes T3 and T4 (Step S7). When the flapper 310 is in the second posture, since the clutch activating piece 316 integrated with the flapper holds the cam gear 350 in the second posture by the swing solenoid 320, the pressuring member 470 is at a pressurizing position illustrated in FIGS. 12(*b*-1) to (*b*-3) and at a pressurizing position indicated by a solid line in FIG. 9 and FIG. 10, and the dog clutch key 450 meshes with the second dog teeth of the second transmission gear 440. Therefore, the drive force from the motor 302 is transmitted to the second circulation drum unit 200 (the drive mechanism of the second circulation drum 35) via the second transmission gear 440.

At Step S5, when the flapper is not in the second posture, the control unit activates the flapper drive mechanism 300 to move the flapper rotationally from the first posture to the second posture (Step S6).

By performing the procedures at Step S5 and thereafter for all the subsequent input banknotes, when storage of all the banknotes has completed, the motor is stopped to end the flow (Steps S7 to 10).

Next, at Step S2, when the banknote storage command is not output, it is checked whether there is a banknote payout command at Step S20, and when the control unit outputs a banknote payout command, it is checked at Step S21 whether a payout route (discharge route) from the circulation drum (for example, the first circulation drum 31) that stores the denomination designated in the banknote payout command is opened (whether the flapper is in the first posture). When the payout route is being opened, control proceeds to Step S23.

At Step S21, when the flapper is not in the first posture, the control unit moves the flapper rotationally from the second posture to the first posture by activating the flapper drive mechanism (Step S22).

At Step S21, when the payout route from the first circulation drum 31 to the feed port 60*a* is being opened (the flapper is in the first posture), the control unit drives the motor 302 in a reverse rotation direction, to rotate the first circulation drum 31, which is in a state connected with the motor, in a feeding direction by the drive transmission switching mechanism 400, and rotates the respective bobbins 105 and 110 in a winding direction, thereby sequentially feeding out the banknotes placed between the tapes T1 and T2 from the outer periphery of the first circulation drum by a designated number of banknotes (Step S23). The number of banknotes paid out is counted by the paper feed sensor at the feed port 60*a*.

When the flapper 310 is in the first posture, since the clutch activating piece 316 integrated with the flapper holds the cam gear 350 in the first posture by the swing solenoid 320, the pressuring member 470 is at the non-pressurizing position illustrated in FIG. 12(*a*) and at the non-pressurizing position indicated by the broken line in FIG. 9 and FIG. 10, and the dog clutch key 450 meshes with the first dog teeth of the first transmission gear 430. Therefore, the drive force from the motor 302 is transmitted only to the first circulation drum unit 100 (the drive mechanism of the first circulation drum 31) via the first transmission gear 430.

At Step S21, when the flapper is not in the first posture, the control unit activates the flapper drive mechanism 300 to move the flapper rotationally from the second posture to the first posture (Step S22).

When the denomination designated for payout is stored in the second circulation drum 35, the control unit confirms whether the flapper 310 is in the second posture to open the route connecting the second circulation drum 35 with the feed port 60*a*. When the flapper 310 is in the second posture, the control unit drives the motor 302 in a reverse rotation direction to rotate the second circulation drum 35 in a feeding direction, and rotates the respective bobbins 205 and 210 in a winding direction to sequentially pay out the banknotes being placed between the both tapes in the process of feeding the tapes T3 and T4 from the second circulation drum up to a designated number of banknotes (Step S23). When the flapper 310 is in the second posture, since the clutch activating piece 316 integrated with the flapper holds the cam gear 350 in the second posture by the swing solenoid 320, the pressuring member 470 is at the pressurizing position illustrated in FIGS. 12(*b*-1) to (*b*-3) and at the pressurizing position indicated by the solid line in FIG. 9 and FIG. 10, and the dog clutch key 450 meshes with the second dog teeth of the second transmission gear 440. Therefore, the drive force from the motor 302 is transmitted to the second circulation drum unit 200 (the drive mechanism of the second circulation drum 35) via the second transmission gear 440.

At Step S24, it is judged that the payout operation at Step S23 has been performed for all the banknotes based on the number of banknotes discharged from the feed port 60*a,* and upon completion of discharge, the motor is stopped to end the flow (Step S25).

<Detachable Guide Mechanism of Circulation Unit>

Figure 15:
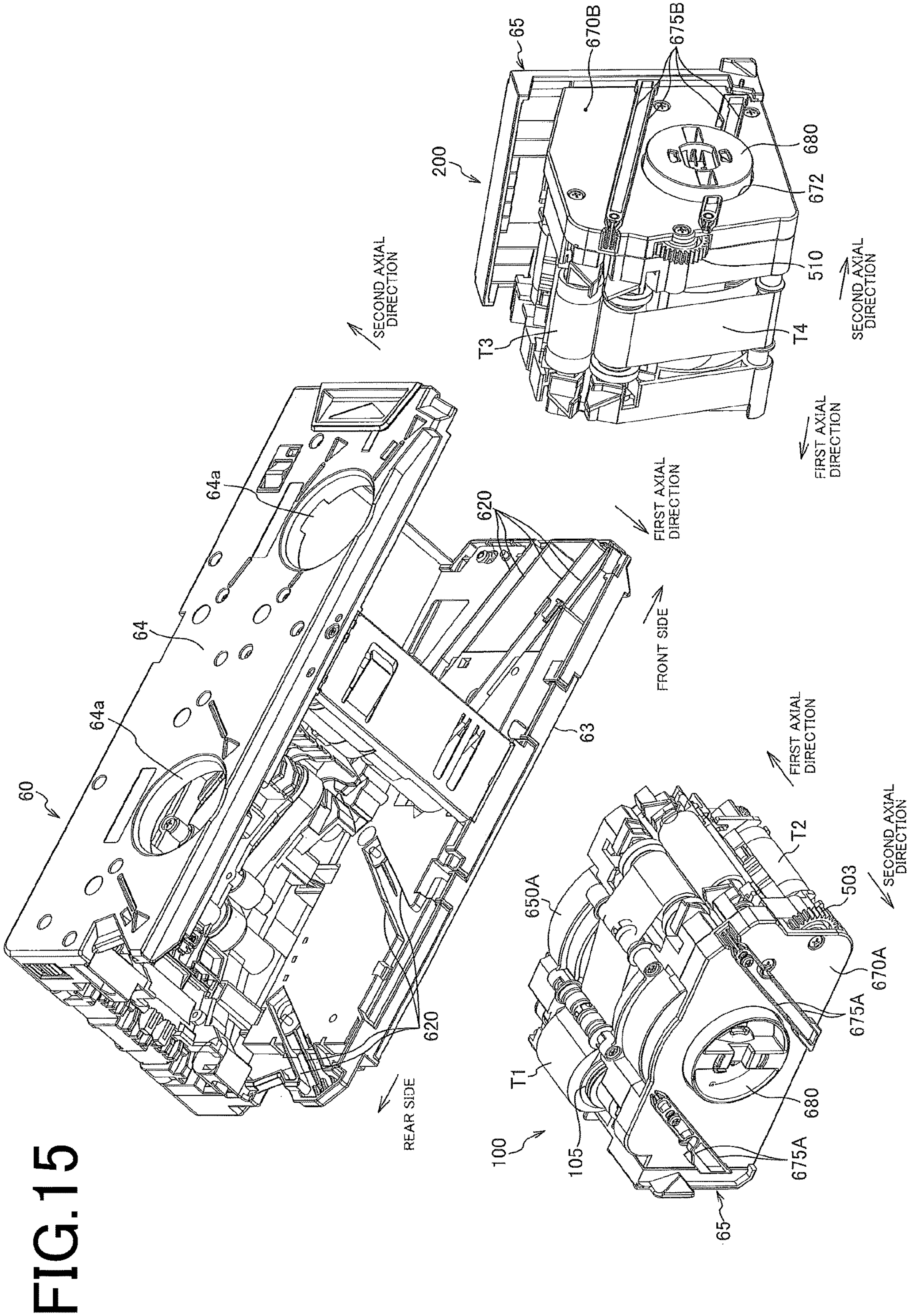
FIG. 15 is a perspective view illustrating a state in which the banknote storage device according to the present invention is disassembled into a casing and the respective circulation drum units.
Figure 16A:
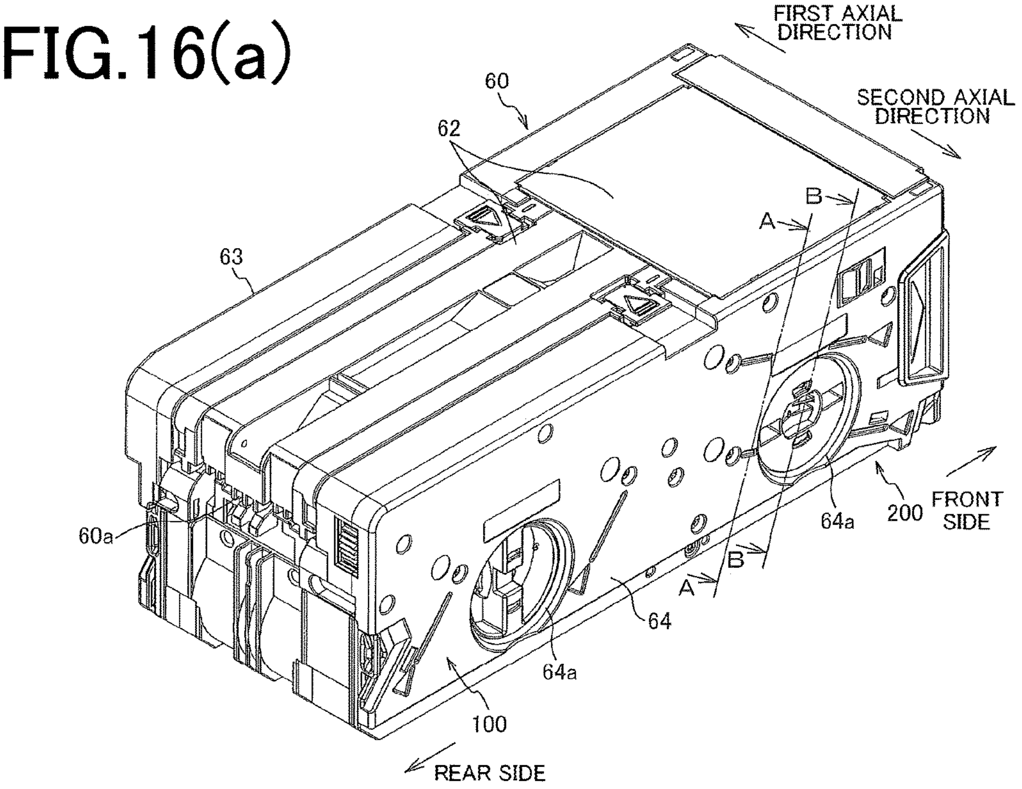
FIGS. 16(*a*), (*b*), and (*c*) are each an external perspective view, a line A sectional view, and a line B sectional view of the banknote storage device according to the present invention.
Figure 16B:
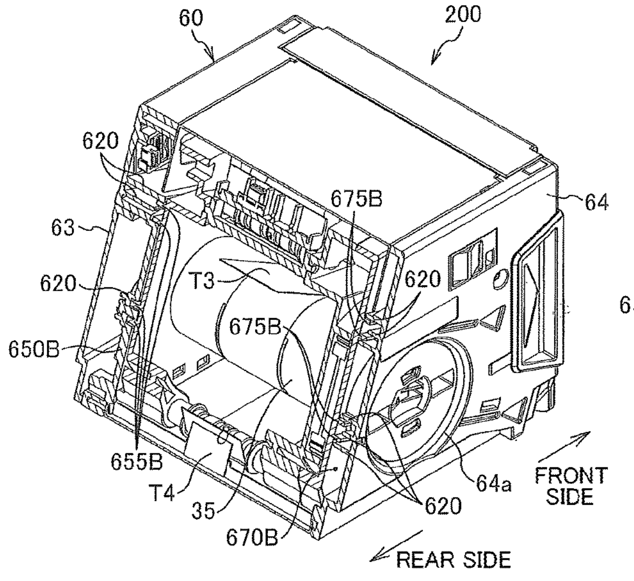
Figure 16C:
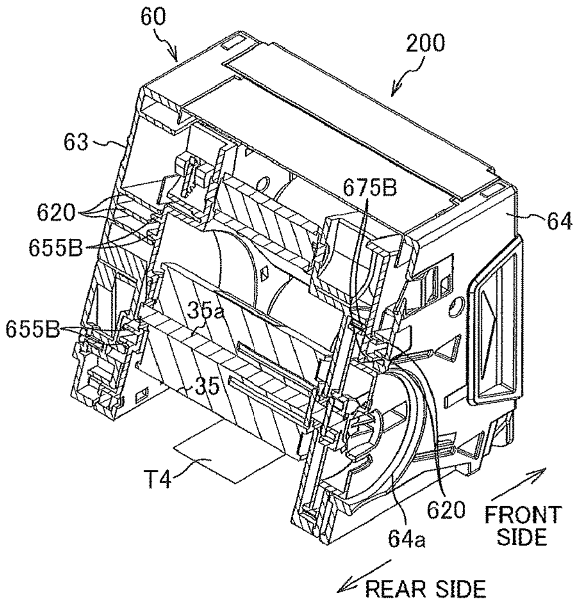
Figure 17A:
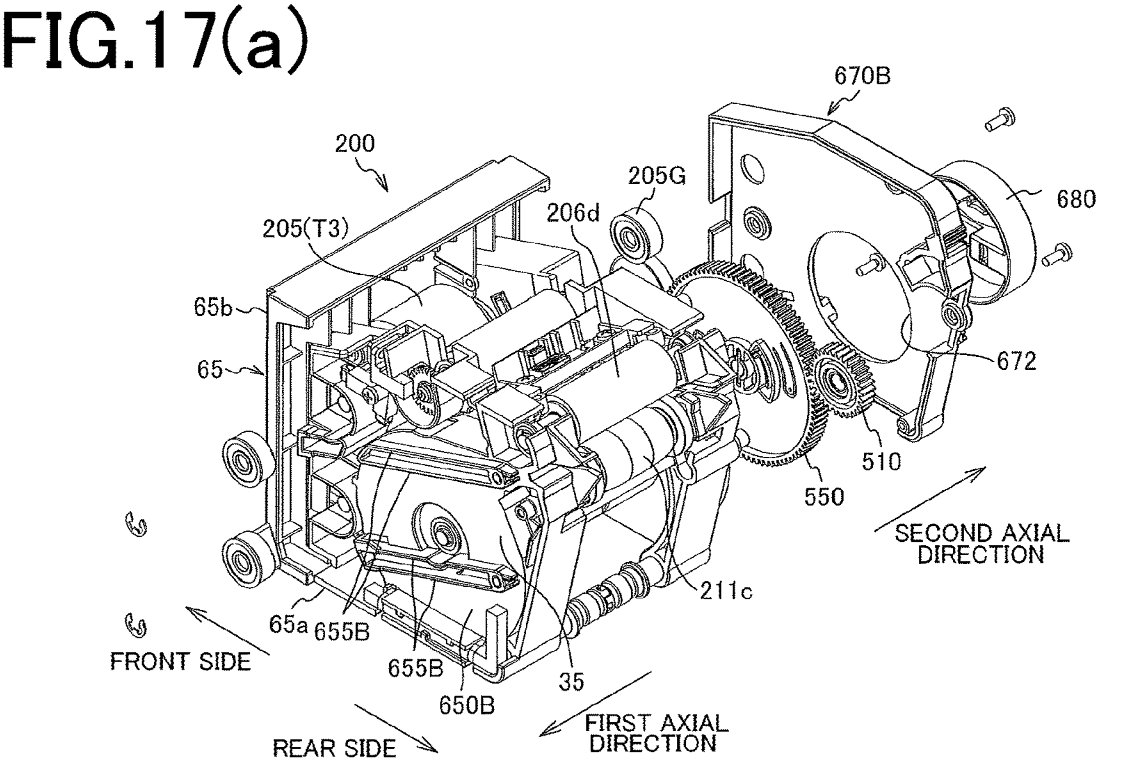
FIGS. 17(*a*) and (*b*) are exploded perspective views of a second circulation drum unit.
Figure 17B:
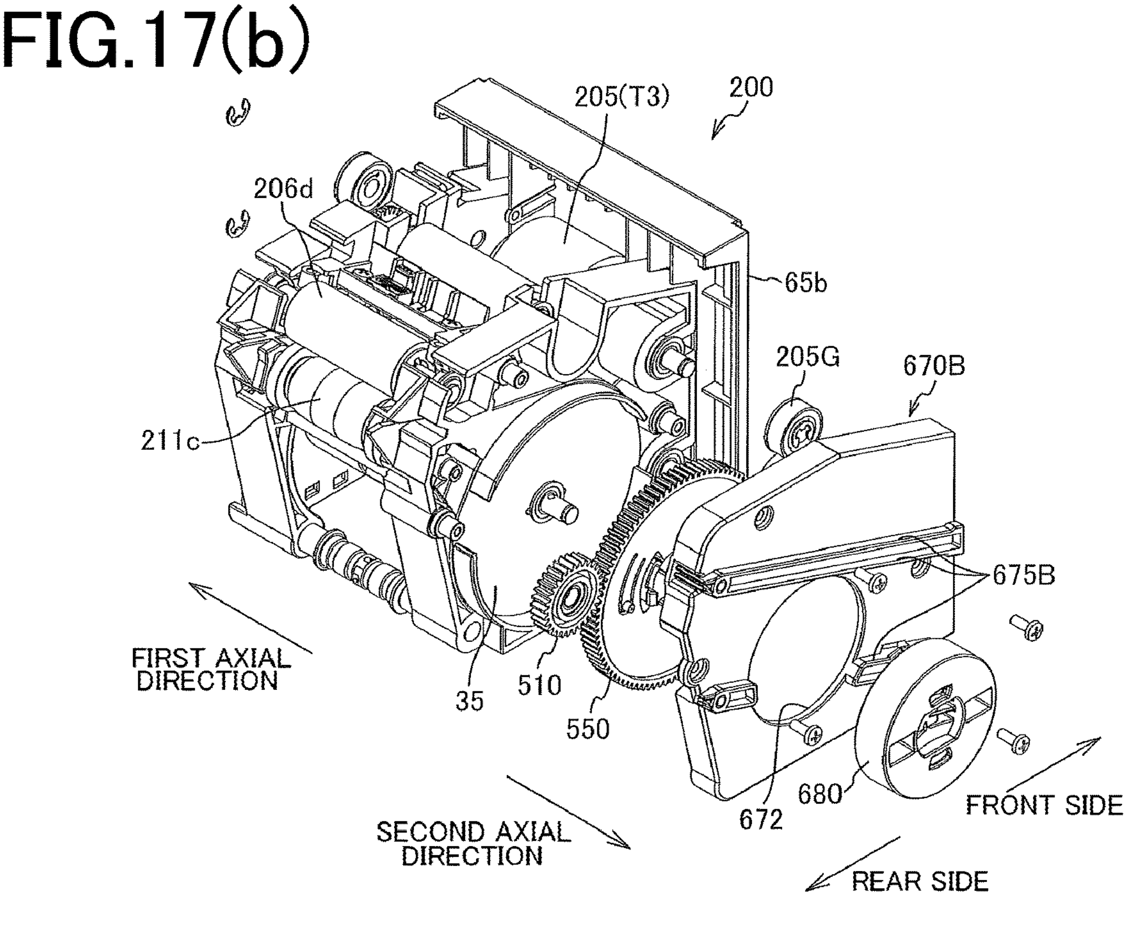
Figure 18:
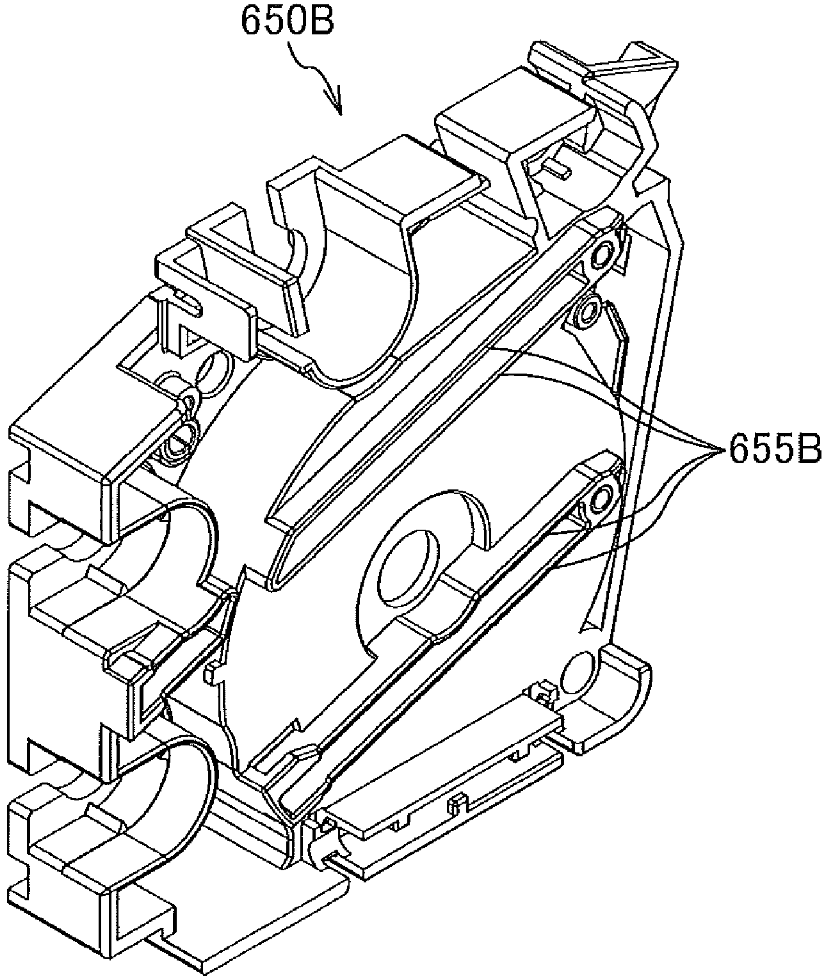
FIG. 18 is a perspective view of a single body of one of side covers 650B as seen from an external surface.

FIG. 15 is a perspective view illustrating a state in which the banknote storage device according to the present invention is disassembled into the casing and the respective circulation drum units. FIGS. 16(*a*), (*b*), and (*c*) are each an external perspective view, a line A sectional view, and a line B sectional view of the banknote storage device according to the present invention. FIGS. 17(*a*) and (*b*) are exploded perspective views of the second circulation drum unit 200. FIG. 18 is a perspective view of a single body of one of side covers 650B as seen from an external surface. FIG. 19(*a*) is an explanatory diagram of a configuration of the first circulation drum unit according to the present invention, and FIG. 19(*b*) is an explanatory diagram of a configuration of a circulation drum unit according to a comparative example.

The detachable guide mechanism 600 is described below with reference to FIG. 6 and FIG. 7.

The circulation-type banknote storage units 30 and 40 according to the present invention include the casing 60, at least one circulation unit 100 (200) that is accommodated (installed) in the casing to receive banknotes transported into the casing by operating upon reception of a drive force from the motor 302 and feed banknotes stored therein to outside of the casing, and the detachable guide mechanism 600 of the circulation unit that enables to attach or detach the circulation unit to or from the casing.

A substantially L-shaped base member 65 is arranged on a bottom side, a rear side, and a front side of respective movable components (the circulation drum, the bobbins, the rollers, the gears, and the like) constituting the respective circulation drum units 100 and 200 to support these components. A bottom plate 65*a*, a rear plate 65*b,* and a front plate 65*c* constituting the respective base members 65 respectively constitute a bottom plate, a rear plate, and a front plate of the casing 60 when assembling each circulation drum unit with a casing body 61.

The detachable guide mechanism of the circulation unit (hereinafter, "detachable guide mechanism") 600 includes guide members 620 and 620, which are respectively provided in both side plates 63 and 64 of the casing 60 to serve as a guide when at least one circulation unit (in this example, two circulation drum units 100 and 200) is attached to or detached from the casing by slidingly moving the circulation unit with respect to the casing side plates. The detachable guide mechanism 600 also includes guided members 655A and 675A on the side of the first circulation drum unit 100 and guided members 655B and 675B on the side of the second circulation drum unit 200 that are provided on the circulation unit side to engage detachably with the guide members 620 and 620 in a sliding manner, and are guided up to an installation completion position (the state in FIG. 5) along the respective guide members in an engaged state with each guide member.

The guide members 620 and the guided members 655A, 655B, 675A, and 675B constitute the detachable guide mechanism 600 of the circulation drum unit.

In the present invention, as described with reference to FIG. 13, all the gears constituting the drive mechanism of the first circulation drum unit 100, that is, the rear-side driven gear 503, the driven gear 560, and the bobbin gears 105G and 110G are arranged on the same side surface of the circulation drum unit, placing the drum gear 550 having a large diameter therebetween. Since the respective gears are intensively provided on the same side surface, an axial length of each rotation shaft including the thickness of each gear can be reduced to decrease the axial dimension (dimension in a width direction) of the circulation drum unit. As a result, the guided members 655A and 675A formed of a ridge having a positional relation and a shape that can be fitted to (meshed with) the guide members 620 and 620 formed of a long ridge provided on an inner wall of the casing side plates 63 and 64 can be each arranged on the both side surfaces of the circulation drum unit, by using a space formed between the both side surfaces of the circulation drum unit and respective inner walls of the casing side plates 63 and 64, without increasing the dimension in the width direction between the casing side plates.

Further, with regard to the second circulation drum unit 200, by downsizing due to the same reason, as illustrated in FIG. 15 and FIG. 17, the guided members 655B and 675B formed of a long and thin ridge (projection) having a positional relation and a shape that can be fitted to (meshed with) the guide members 620 and 620 formed of a long and thin ridge (projection) provided on the inner wall of the casing side plates 63 and 64 can be each arranged on the both side surfaces of the circulation drum unit 200.

As illustrated in FIG. 6, FIG. 7, FIG. 17, FIG. 19(*a*), and the like, one side of the respective circulation drums 31 and 35 (a side surface on the first axial direction side) is each covered with a side cover 650A and 650B, and the other side (a side surface on the second axial direction side) is each covered with a side cover 670A and 670B. Each side cover is fixed to the base member 65 or the like, and on an external surface of each side cover, the guided members 655A, 655B, 675A, and 675B formed of the two thin plate-like projections are formed in a pair parallel to each other with a required gap therebetween. The respective guided members 655A, 655B, 675A, and 675B are ridges (long and thin projections) extending linearly and projecting to the side from the external surfaces of the respective side covers 650A, 650B, 670A, and 670B, and are slidably supported in a longitudinal direction thereof, in a state being fitted to the respective guide members 620 and 620 that are formed of two ridges that are respectively provided on the inner surfaces of the respective side plates 63 and 64 of the casing and extending linearly, or in a state meshed therewith alternately. Since the respective guided members 655A, 655B, 675A, and 675B are linearly guided by the respective guide members 620 and 620, an advancing and retreating direction of each circulation drum unit with respect to the casing 60 is decided in an unambiguous manner.

Further, a round hole 672 each formed in the side covers 670A and 670B is an opening for exposing outside an operating member 680 mounted on a drum shaft for manually operating the circulation drum. On one side plate 64 of the casing corresponding to the round hole 672, a round hole 64*a* that enables manual operation from outside of the casing by exposing the operating member 680 to outside is formed in two places (FIG. 15).

As illustrated in FIG. 7 and FIG. 15, the side covers 650A, 650B, 670A, and 670B are arranged on the both side surfaces of the respective circulation drums 31 and 35 constituting the respective circulation drum units 100 and 200, so as to cover the respective circulation drums and the respective gears. On external surfaces of the respective side covers, two pairs of guided members 655A, 655B, 675A, and 675B in a rail shape are arranged in parallel and linearly in a diagonal direction. Further, two pairs of guide members 620 and 620 in a rail shape are arranged in parallel and linearly on each inner wall of the casing side walls 63 and 64 facing these two pairs of guided members 655A, 655B, 675A, and 675B. A plurality of (in this example, two) plate-like projections constituting the respective guided members and a plurality of (in this example, two) plate-like projections constituting the respective guide members 620 engage with each other slidably in a longitudinal direction so as not to fall off in an alternately meshed state as illustrated in FIGS. 16(*a*) and (*b*), or in a state in which one of the projections is fitted to (enters into) the other.

The respective guided members 655A, 655B, 675A, and 675B and the guide members 620 and 620 having a configuration in which two thin plate-like projections are arranged in parallel with a predetermined gap therebetween are respectively arranged by being inclined with the same angle with respect to a horizontal surface. The arranged direction (extending direction) of the respective inclined guided members and guide members is set so as to be respectively parallel to a contact travel area (linear transport route) TA in which the respective tapes T1 and T2 fed from the respective bobbins 105 and 110 illustrated in FIG. 5 and the like toward the circulation drum 31 join together after the last guide rollers 106*c* and 111*d* and a contact travel area (linear transport route) TB in which the respective tapes T3 and T4 join together after the last guide rollers 206*d* and 211*c*. Therefore, when the respective circulation drum units are assembled with respect to the casing by using the detachable guide mechanism 600, even if a misregistration occurs in a transport direction along the respective contact travel areas TA and TB between the guide members 620 and 620 on the casing side and the respective guided members 655A, 655B, 675A, and 675B due to a precision error and an assembly error of components or the like, it only causes slight variations in a gap between a terminal end of the rear-side feed route 70 and a start point of the contact travel area TA, and a vertical difference in level (a difference in level in a direction intersecting with a surface of a transported banknote), which becomes an obstacle in transport of banknotes, is not generated.

Figure 20A:
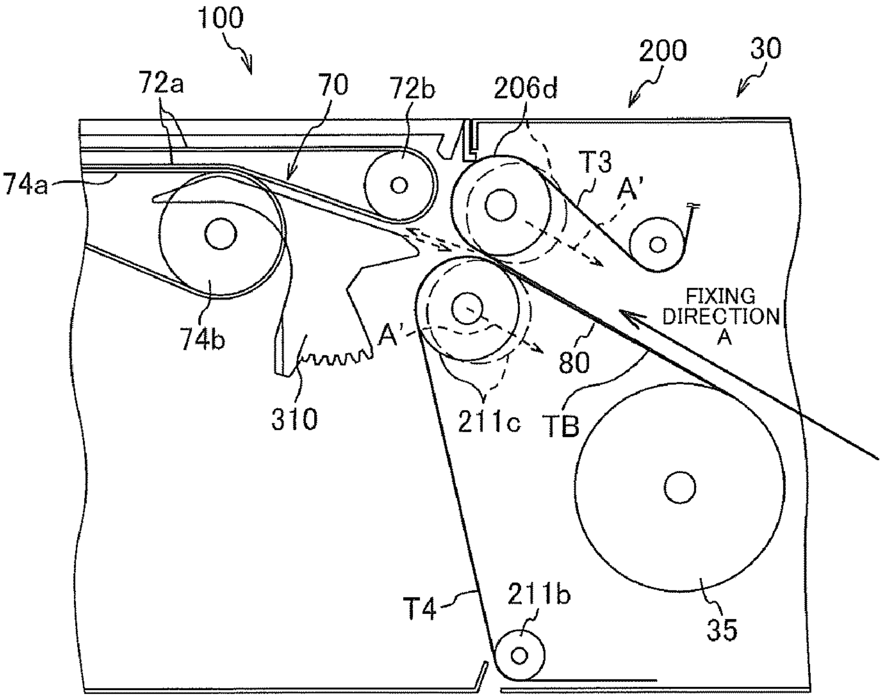
FIG. 20(*a*) is an explanatory diagram of a case in which a misregistration occurs along a transport direction in a contact travel area TB between the casing and the circulation drum unit in the second circulation drum unit, and FIG. 20(*b*) is an explanatory diagram of a case in which a misregistration occurs along a direction intersecting with the transport direction in the contact travel area TB between the casing and the circulation drum unit.
Figure 20B:
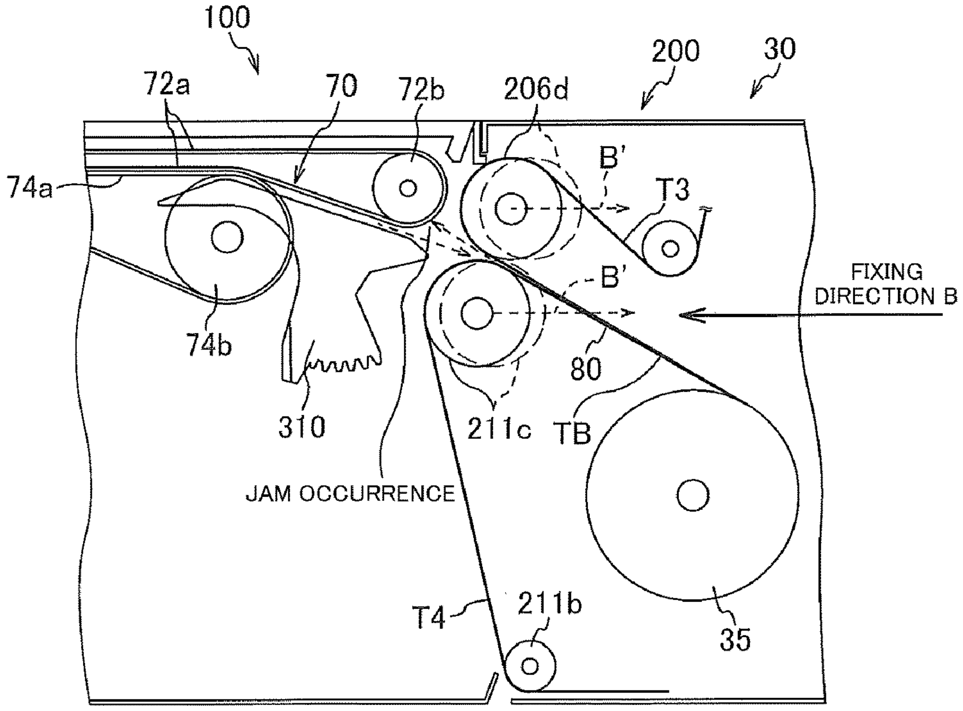

FIG. 20(*a*) is an explanatory diagram of a case in which a misregistration occurs along a transport direction in the contact travel area TB between the casing and the circulation drum unit in the second circulation drum unit 200. FIG. 20(*b*) is an explanatory diagram of a case in which a misregistration occurs along a direction intersecting with the transport direction in the contact travel area TB between the casing and the circulation drum unit. The same applies to the first circulation drum unit 100.

In FIG. 20(*a*), since an extending direction (a fixing direction A) of the guide members 620 and 620 on the casing side and the respective guided members 655A, 655B, 675A, and 675B is a direction parallel to the contact travel area TB, a misregistration in the direction parallel to the contact travel area TB (the fixing direction A) may occur at the time of assembly. In this case, as indicated by a dashed arrow A' in the drawing, the last guide rollers 206*d* and 211*c* may cause a misregistration in a lower right direction. However, since this misregistration direction A' is a direction parallel to the contact travel area TB, it only causes the gap between the terminal end of the rear-side feed route 70 and the start point of the contact travel area TB to slightly widen, and as indicated by the dashed arrow, any change does not occur in the route of banknotes that are transported in the gap, and thus paper jam does not occur.

Meanwhile, in the case of FIG. 20(*b*), the direction in which the guide members 620 and 620 guide the respective guided members 655A, 655B, 675A, and 675B is the direction intersecting with the contact travel area TB, in this example, a horizontal direction. Therefore, a misregistration may occur in the horizontal direction (a fixing direction B), which is not parallel to the contact travel area TB at the time of assembly. In this case, as indicated by a dashed arrow B' in the drawing, the last guide rollers 206*d* and 211*c* cause a misregistration in the right horizontal direction. Since this misregistration direction B' is not parallel to the contact travel area TB, a position of the start point of the contact travel area TB with respect to the terminal end of the rear-side feed route 70 is deviated rightward from a regular position. Therefore, as indicated by the dashed arrow, a banknote discharged from the start point of the contact travel area TB toward the terminal end of the rear-side feed route 70 is likely to collide with the upper guide roller 72*d* to cause paper jam. On the contrary, a banknote transported from the terminal end of the rear-side feed route 70 toward the start point of the contact travel area TB is likely to collide with the guide roller 211*c* to cause paper jam.

Next, an advantage of the detachable guide mechanism of the present invention illustrated in FIG. 19(*a*) is described based on a comparative diagram illustrated in FIG. 19(*b*).

That is, FIGS. 19(*a*-1) to (*a*-3) are respectively a plan view, a right-side perspective view, and a left-side perspective view of the circulation drum unit including the detachable guide mechanism of the present invention. FIGS. 19(*b*-1) to (*b*-3) are respectively a plan view, a right-side perspective view, and a left-side perspective view of a circulation drum unit that does not include the detachable guide mechanism.

The components corresponding to those of the present invention in the comparative example in FIGS. 19(*b*-1) to (*b*-3) are denoted with like reference signs, added with X at the end of each reference sign, so as to be distinguished from the components of the present invention.

The major difference of a first circulation drum unit 100X of the comparative example from the circulation drum unit 100 according to the present invention is that the drum gear 550 is not provided. As a result of having no drum gear 550, in the comparative example, the rear-side driven gear 503, the driven gear 560, and the bobbin gears 105G and 110G cannot be arranged all on the same side surface side as in the present invention. That is, in the present invention, since the drum gear 550 is commonly used as means for transmitting a drive force from the motor to each gear, the rear-side driven gear 503, the driven gear 560, and the bobbin gears 105G and 110G can be arranged on the same side surface of the drum gear. Therefore, the width dimension of the circulation drum unit increases only for the thickness of one gear.

In the first circulation drum unit 100X according to the comparative example, while a rear-side driven gear 503X, a driven gear 560X, and other driven gears 561X and 562X are arranged on one of the side surfaces, bobbin gears 105GX and 110GX, and another driven gear 563X are arranged on the other side surface. A drive force from a motor (not illustrated) is transmitted to the rear-side driven gear 503X, the driven gear 560X, and the driven gear 561X, and is further transmitted to the driven gear 563X on the other side surface, which is fixed on the same shaft as that of the driven gear 561X. A drive force from the driven gear 563X is transmitted to the respective bobbin gears 105GX and 110GX via another transmission gear (not illustrated).

According to numerical values representing the dimensions respectively indicated in FIGS. 19(*a*-1) and (*b*-1), the width dimensions of body portions of the circulation drum unit 100 of the present invention and the circulation drum unit 100X of the comparative example are both 90 millimeters. However, in the circulation drum unit 100 according to the present invention, the entire width dimension including a projection length of the guided member 655A provided in the side cover 650A and a projection length of the guided member 675A provided in the side cover 670A is only 109.5 millimeters, whereas the entire width dimension of the circulation drum unit 100X of the comparative example is 112.3 millimeters. The main cause of increasing the entire width dimension of the circulation drum unit 100X of the comparative example is that the gears 503X and 560X are arranged on one side surface, and the bobbin gears 105GX and 110GX are arranged on the other side surface.

Further, in the comparative example, the rear-side driven gear 503X and the driven gear 560X corresponding to the rear-side driven gear 503 and the driven gear 560 according to the present invention are arranged on the same side surface; however, the bobbin gears 105GX and 110GX corresponding to the bobbin gears 105G and 110G are arranged on the other side surface. Since the respective gears are arranged on the both side surfaces in a dispersed manner, the width dimension of the circulation drum unit 100X increases by the thickness of one gear.

Further, since the guided members 655A and 675A according to the present invention are fitted to the guide members 620 and 620 provided on the casing side in a nesting manner in a meshed state, the sum total (8 millimeters) of the projection length of the guided member projecting from the both side surfaces can be decreased from 109.5 millimeters, which is the entire width dimension of the circulation drum unit 100, thereby further decreasing the width dimension of the circulation drum unit 100 according to the present invention. That is, the effect of decreasing the width dimension by consolidating the gear group on one side surface is large, and the guided members 655A and 675A can be arranged on the both side surfaces of the circulation drum unit without changing the width dimension of the casing.

The effect of decreasing the width dimension described with regard to the first circulation drum unit 100 is similarly applied to the second circulation drum unit 200.

As described above, the banknote storage unit 30 including the detachable guide mechanism according to the present invention is characterized such that the circulation drum unit 100 includes the movable components 31, 105, and 110 driven by the motor 302, and a plurality of gears 503, 550, 560, 570, 105G, and 110G that transmit a drive force from the motor to the movable components, and the respective gears are arranged on one side surface of the circulation unit corresponding to the axial one end side of the respective gears.

Further, with regard to the banknote storage unit 40, as illustrated in FIG. 17, the circulation drum unit 200 includes the movable components 35, 205, and 210 driven by the motor 302, a plurality of gears 510, 550, 205G, and 210G, and the like that transmit a drive force from the motor to the movable components, and the respective gears are arranged on the other side surface of the circulation unit corresponding to the axial other end side of the respective gears.

The respective circulation drum units 100 and 200 have such a configuration that the drum gear 550 is arranged on one side surface of the respective circulation drum units, and a drive force from the motor by the respective driven gears 503 and 510 is respectively transmitted directly to the other gears 560, 570, 105G, and 110G, and the other gears 510, 205G, 210G, and the like arranged on the same side surface via the respective drum gears 550. Accordingly, projections such as gears on the side of the other side surface of the circulation unit can be omitted to decrease the width direction of the circulation unit. Therefore, the guided members 655A and 675A and the guided members 655B and 675B as projections can be respectively arranged on the opposite side surfaces of the circulation drum unit without increasing the width dimension of the casing.

The guided members 655A and 675A and the guided members 655B and 675B as projections have a configuration such that the guided members alternately enter into the guide members 620 and 620 on the casing side while meshing with each other (fitted thereto in a nesting manner). Therefore, an occupied space in the width direction in the casing can be decreased by the fitted length.

In the above embodiment, a configuration example in which two circulation units are arranged in the casing has been described. However, the present invention can be also applied to a banknote storage unit in which one circulation unit is arranged in the casing.

Further, the circulation unit is not limited to the drum and tape type, and all sorts of circulation units can be adopted.

Summary of Configuration, Action, and Effects of Present Invention

The paper sheet storage units (30 and 40) according to the first invention include the casing 60, and the circulation units (100 and 200) that are accommodated in the casing to receive paper sheets transported into the casing by operating upon reception of a drive force from the motor 302 and feed paper sheets stored therein to outside of the casing. The configuration is characterized such that the casing includes the guide members 620 that serve as a guide at the time of attaching or detaching the circulation unit to or from the casing by slidingly moving the circulation unit with respect to the casing, and the circulation units include the guided members (655A, 675A, 655B, and 675B), which detachably engage with the guide member respectively, and are guided to an installation completion position along the guide member in an engaged state.

The present invention can be also applied to a paper sheet storage unit of a type in which one circulation unit is attached and detached with respect to one casing.

The configuration of the circulation unit is not limited to the drum type, and all sorts of configurations can be applied.

If paper jam or other failures occur in the circulation unit, it is often difficult to perform jam processing and repair on the user side. In such a situation, conventionally, replacement of the entire paper sheet storage unit including the circulation unit by calling a maintenance personnel has been the only measure, which increases the cost and decreases the operating rate.

In the present invention, since the circulation unit is detachable with respect to the casing, a user only needs to prepare a spare circulation unit in advance, and the functions of the paper sheet storage unit and the paper sheet processing device can be swiftly recovered by a simple operation of detaching an old circulation unit and attaching the spare circulation unit. That is, a component (group) to be replaced is set to a minimum module unit. Therefore, the operation can be continued without increasing the cost. The number of screws as means for fixing each circulation unit to the casing after attachment is considerably fewer than the number of screws required for assembling the circulation unit. Therefore, a user can replace the circulation unit by a spare circulation unit by a very simple operation.

As in the embodiment, in a case in which the circulation unit is a circulation drum unit constituted by a circulation drum and tapes, if a paper sheet is jammed between the tapes to stop the operation, it is required to remove many screws to detach the circulation unit from the casing, and then disassemble the circulation unit to extract the paper sheet jammed between the tapes. However, the tape may be entangled or loosened, and the work is difficult for a user who is not a specialist. If a user cuts the tape to deal with the problem, the circulation unit becomes a malfunction state, and the operation is stopped due to irrecoverable damage. Further, the work to disassemble the circulation unit itself is difficult due to a large number of screws, and once the circulation unit is disassembled, the assembly work is further difficult.

In the present invention, since the guided members provided on the circulation unit side are slidably engaged with the guide members in a rail shape provided in the casing, a user can newly attach a spare circulation unit to recover the function only by detaching and attaching a minimum number of screws and detaching and attaching a harness (a connector). Also, in a case in which a plurality of circulation units are stored in one casing, each circulation unit can be individually detached and replaced by a simple operation. Therefore, the troubleshooting cost can be considerably decreased so as to increase the advantage on the user side.

The paper sheet storage unit according to the second invention is characterize such that the circulation unit includes movable components driven by the motor, and a plurality of gears that transmit a drive force from the motor to the movable components, and the respective gears are arranged on one side surface of the circulation unit corresponding to an axial one end of the respective gears.

Since the gear group that drives the movable components constituting the circulation unit are intensively arranged on one side surface of the circulation unit, the entire width dimension of the circulation unit can be decreased by little more than the thickness of the gear, as compared with a case in which the gears are arranged on the both side surfaces of the circulation unit in a dispersed manner. Since there is an allowance in the space of the casing due to the decreased width dimension, the guide members 620, the guided members 655A, 675A, 655B, and 675B can be arranged.

The paper sheet storage unit according to the third invention includes the first circulation unit 100 and the second circulation unit 200 that receive transported paper sheets by operating upon reception of a drive force from the motor and feed paper sheets stored therein, the sorting unit 310 that sorts transported paper sheets to either one of the circulation units by changing a posture thereof, the sorting-unit drive mechanism 300 that drives the sorting unit, and the drive transmission switching mechanism that selectively switches and transmits the drive force from the motor to either one of the circulation units. The configuration is characterized such that the drive transmission switching mechanism is activated in conjunction with an operation of the sorting unit to change the posture, to switch and transmit the drive force from the motor to either one of the circulation units.

The detachable guide mechanism 600 according to the present invention can be also applied to the paper sheet storage unit including the sorting-unit drive mechanism 300.

The paper sheet storage unit according to the fourth invention is characterized such that the circulation unit includes the circulation drum that spirally winds two tapes around an outer periphery thereof in an overlapped state on each other and feeds each of the tapes in a process of rotating in forward and reverse directions, and two bobbins that respectively feed each of the tapes to the outer periphery of the circulation drum and wind each of the tapes in a process of rotating in forward and reverse directions. Each of the tapes forms a linear contact travel area TA or TB in which the tapes come in contact with each other and transport a paper sheet, while placing the paper sheet therebetween, at a position immediately before moving to the outer periphery of the circulation drum, and a guide direction of the guide member to guide the guided member is parallel to the contact travel area.

When the circulation unit is constituted by the circulation drum and two tapes (films), the contact travel area TA (TB) of the two tapes is formed at a position immediately before the circulation drum in the paper sheet transport route. In a case in which this paper sheet transport route is linear, an attachment and detachment direction of each circulation drum unit with respect to the casing is preferably a linear direction parallel to the contact travel area.

In a case in which there is a misregistration between the casing and the circulation drum unit due to a precision error of components or the like in each device, if an in and out direction of a paper sheet immediately before the circulation drum and the attachment and detachment direction of the circulation drum unit with respect to the casing intersect each other, such a situation occurs that the circulation drum unit is fixed by screws in a misregistered state, thereby causing misregistration in a transfer portion between the transport route 70 on the casing side and the contact travel areas TA and TB on the respective circulation drum unit side, to cause transport failure such as paper jam. Further, a misregistration between the gears also occurs, to cause a problem in drive transmission.

However, if the contact travel area and the attachment and detachment direction are parallel to each other as in the present invention, a misregistration of the circulation drum unit with respect to the casing becomes parallel to the attachment and detachment direction. Therefore, a critical misregistration that causes transport failure in the transfer portion between the transport route 70 and the contact travel areas TA and TB on the respective circulation drum unit side does not occur.

The paper sheet storage unit according to the fifth invention includes the drum gear 550 integrated with the circulation drum on one side surface thereof, the driven gear 503 (510 or 560) meshed with the drum gear to transmit a drive force from the motor to the drum gear, and the bobbin gears 105G and 110G (205G and 210G) respectively integrated with the shaft of the respective bobbins to mesh with the drum gear. The configuration is such that the driven gears and the bobbin gears are respectively arranged on the same side surface as the drum gear.

Since the drum gear having a large diameter and integrated with the shaft portion of the circulation drum is arranged on one side, the gear that transmits a drive force from the motor to the drum gear and the bobbin gears that receive the drive force transmitted from the drum gear can be arranged on the same side surface, thereby enabling to reduce the axial dimension of the circulation drum unit. Therefore, the guide members 620 and the guided members 655A, 675A, 655B, and 675B can be arranged without increasing the width dimension of the casing.

The paper sheet storage unit according to another invention includes the single motor 302, the first circulation unit 100 and the second circulation unit 200 that respectively receive transported paper sheets by operating upon reception of a drive force from the motor and feed paper sheets stored therein, the drive transmission switching mechanism 400 that selectively switches and transmits the drive force from the motor to either one of the circulation units, the sorting unit 310 that sorts transported paper sheets to either one of the circulation units by changing a posture thereof, and the sorting-unit drive mechanism 300 that drives the sorting unit. The configuration is such that the drive transmission switching mechanism is activated by changing the posture of the sorting unit by the sorting-unit drive mechanism, to switch and transmit the drive force from the motor to either one of the circulation units.

Drive of the circulation unit is generally performed by one motor for one circulation unit. However, according to the present invention, by adopting the drive transmission switching mechanism, the two circulation units that accommodate therein banknotes of a denomination different from each other can be driven by one motor, thereby decreasing the number of motors. Due to the reduction in the number of motors, the hardware configuration is simplified to realize cost reduction, and software control can be also simplified. The circulation unit is not limited to the circulation drum type described in the embodiment, and includes all sorts of units that can accommodate and pay out paper sheets in a circulating manner without using a drum or a tape.

The sorter 310 is a unit that switches the transport route and the transport direction of paper sheets fed from the feed port 60*a* of the paper sheet storage devices 30 and 40 to either one of the circulation units. The paper sheet paid out from the respective circulation units is guided to the feed port by the sorter. At the time of reciprocating the sorter within a predetermined angular range, the drive transmission switching mechanism 400 is activated to perform switching of the transmission direction of the drive force simultaneously.

In this manner, in the circulation-type paper sheet storage unit of a type including two circulation units, switching of a drive force to respective circulation units can be realized by using the sorter for switching the transport route.

The drive transmission switching mechanism according to present invention is the drive transmission switching mechanism 400 that switches and transmits a drive force from the single motor 302 selectively to either one of a first load (in the embodiment, the first circulation drum unit 100) and a second load (in the embodiment, the second circulation drum unit 200). The drive transmission switching mechanism 400 includes the main drive gear 410 driven to be rotated upon reception of a drive force from the output gear 303 of the motor, the fixed shaft 415 that pivotally supports a shaft hole of the main drive gear so as to be able to rotate via the rotary sleeve 420, the rotary sleeve 420 that is supported immovably in an axial direction but so as to be able to rotate relative to the fixed shaft inserted into the central hole 420*a*, and fixedly supports the shaft core (a shaft hole) of the main drive gear, the first transmission gear 430 in which a shaft hole is pivotally supported so as to be able to rotate relative to the rotary sleeve portion (outer periphery) on the first axial direction side of the main drive gear, to transmit the drive force to the first load side, the second transmission gear 440 in which a shaft hole is pivotally supported so as to be able to rotate relative to the rotary sleeve portion (outer periphery) on the second axial direction side of the first transmission gear, to transmit the drive force to the second load side, and the first dog teeth 432 and the second dog teeth 442 provided on surfaces opposite to each other of the first transmission gear and the second transmission gear. Further, the drive transmission switching mechanism 400 includes the dog clutch key 450 that is supported axially movably by the rotary sleeve portion located between the first transmission gear and the second transmission gear and meshes with the first dog teeth when located at a position biased toward the first axial direction, and meshes with the second dog teeth when located at a position biased toward the second axial direction, the first resilient member 460 arranged between the rotary sleeve portion on the first axial direction side than the dog clutch key and the fixed shaft, the second resilient member 465 arranged between the rotary sleeve portion on the second axial direction side than the dog clutch key and the fixed shaft, and the pressurizing member 470 inserted into a gap between the outer periphery of the fixed shaft and the central hole of the rotary sleeve from the first axial direction side to press the dog clutch key against the second transmission gear via the first resilient member. The configuration is characterized such that when the pressurizing member is not pressing the first resilient member (or is not pressing the first resilient member with a force equal to or larger than a predetermined value), the dog clutch key meshes with the first dog teeth of the first transmission gear by the second resilient member, to transmit the drive force from the main drive gear to the first load. When the pressurizing member presses the first resilient member, the dog clutch key meshes with the second dog teeth of the second transmission gear, to transmit the drive force from the main drive gear to the second load.

If the two loads (objects to be driven) are driven each by one motor, the number of components increases, the hardware configuration becomes complicated, and software control also becomes complicated, thereby increasing the cost.

According to the present invention, by enabling to drive two loads by one motor, the hardware configuration and software control are simplified by reducing the number of motors, thereby enabling to realize cost reduction. Further, since the transmission direction of a drive force can be switched by using the operation of essential components (for example, the paper sheet transport direction switching unit in the two drum-type paper sheet storage device) in the device in which two loads are driven by one motor, reduction of the number of components, downsizing, and low cost can be realized.

While the drive force from the motor is transmitted to the main drive gear integrated with the rotary sleeve, the first and second transmission gears are supported rotatably relative to the rotary sleeve. The dog clutch configured to be able to move axially by the rotary sleeve and rotate integrally with the rotary sleeve meshes selectively with one of the transmission gears by advancing or retreating axially, to cause the one transmission gear to be integrated with the rotary sleeve temporarily, thereby enabling to transmit the drive force. As means for activating the dog clutch, the pressurizing member is used and the pressurizing member is activated by the activation mechanism.

As a load to become a switching target of the drive force transmission, it is not limited to the paper sheet storage device described in the embodiment, and any kind of targets can be assumed. It is not always necessary to support the pressurizing member by the fixed shaft so as to be able to advance and retreat, and any support structure can be used.

The drive transmission switching mechanism 400 according to the present invention includes the activation mechanism 480 that activates the pressurizing member 470. The activation mechanism includes the driven gear portion 352 that is moved rotationally by a pivot shaft parallel to the fixed shaft and receives a drive force from another drive gear member 316 in one part of the outer periphery thereof, and the cam gear 350 including the cam portion 354 that activates the pressurizing member by coming into contact with the cam follower **470*b*** provided in the pressuring member to rotate, in the other part of the outer periphery. The activation mechanism is characterized such that the cam portion has a shape so as to advance and retreat the pressurizing member in an axial direction via the cam follower in a process in which the cam gear moves rotationally in forward and reverse directions.

As the activation mechanism for biasing the first resilient member by advancing and retreating the pressurizing member in a gap between the external side of the fixed shaft and the rotary sleeve, for example, the cam gear 350 that operates upon reception of a drive force from the other drive gear member 316 can be used. Accordingly, the activation mechanism can be established only by adding a simple component to an existing component (a flapper).

The paper sheet storage units 30 and 40 according to the present invention include the drive transmission switching mechanism 400. The configuration is characterized such that the first and second loads are respectively the circulation drum units 100 and 200 that receive and store a paper sheet sorted by the sorter 310 respectively in a process of being transported, and the cam gear 350 is moved rotationally in forward and reverse directions via the driven gear portion by moving the sorter rotationally in forward and reverse directions, to move the drive gear member rotationally in forward and reverse directions.

Drive of the circulation drum of a tape (film) winding type is generally performed by one motor for one circulation drum. However, according to the present invention, by adopting the drive transmission switching mechanism, the two circulation drums that accommodate banknotes of a denomination different from each other can be driven by one motor, thereby decreasing the number of motors. Due to the reduction in the number of motors, the hardware configuration is simplified to realize cost reduction, and software control can be also simplified.

The sorter 310 is a unit that switches a paper sheet fed from the feed port **60*a* of the paper sheet storage devices 30 and 40** to either one of the circulation drum units. When the sorter is reciprocally moved within an angular range of, for example, 20 degrees by the swing solenoid, switching of the transmission direction of the drive force is simultaneously performed.

In this manner, switching of a drive force to each circulation-type drum unit can be realized by using a sorter for switching a transport route, which has been conventionally used in a two drum-type circulation-type paper sheet storage unit.

The paper sheet processing device according to the present invention is characterized such that the paper sheet storage unit is provided.

According to the paper sheet processing device, it is possible to drive a paper sheet storage unit including two loads by one motor, thereby obtaining an advantage of simplifying and downsizing the configuration, reducing the cost, and the like.

REFERENCE SIGNS LIST

1 banknote processing device, 3 housing, 5 input/output port, 7 return port, **9*a* stored-banknote transport route, 9*b* stored-banknote transport route, 11 collective deposit unit, 13 centering unit, 15 recognition unit, 20 escrow unit, 21 escrow drum, 22 stacking unit, 23 payout drum, 30, 40 circulation-type banknote storage unit (circulation-type banknote storage device), 31, 35 circulation drum (movable component), 31*a* drum shaft, 41, 45 circulation drum, 50 collection box, 60 casing, 60*a* feed port, 61 casing body, 62 top panel, 63, 64 side plate, 63*a* opened portion, 63*b* side plate lid, 65 base member, 65*a* bottom plate, 65*b* rear plate, 65c front plate, 70 rear-side feed route (transport route), 72**,

74 transport mechanism, 72*a* belt, 72*b* roller, 74*a* belt, 80 front-side feed route (transport route), 100 first circulation drum unit (first circulation unit), 105, 110 bobbin (movable component), 105G, 110G bobbin gear, 106*a* to 106*c* guide roller, 111*a* to 111*d* guide roller, T1, T2, T3, T4 tape, 200 second circulation drum unit (second circulation unit), 205, 210 bobbin (movable component), 206*a* to 206*d* guide roller, 211*a* to 211*c* guide roller, 300 flapper drive mechanism (sorter drive mechanism), 302 motor, 303 output gear, 310 flapper, 310*a* claw, 312 pivot shaft, 315 protruding piece, 316 clutch activating piece, 316*a* gear portion, 320 swing solenoid, 350 cam gear, 350*a* shaft portion, 352 driven gear portion, 354 cam portion, 354*a* cam surface, 356 douser, 360 detection sensor, 400 drive transmission switching mechanism, 410 main drive gear, 415 fixed shaft, 420 rotary sleeve, 420*a* central hole, 422 movable support hole, 430 first transmission gear, 430*a* bearing member, 440 second transmission gear, 432, 442 dog teeth, 432*a,* 442*a* peak, 432*b,* 442*b* valley, 440*a* bearing member, 450 dog clutch key, 450*a* insertion hole, 460 first coil spring (first resilient member), 465 second coil spring (second resilient member), 470 pressurizing member, 470*a* cylindrical portion, 470*b* flange (cam follower), 475, 476 bearing member, 480 (350, 352, 354) activation mechanism, 500 rear-side driven gear, 501 rear-side drive shaft, 502 rear-side driven gear, 503 rear-side driven gear (driven gear), 510 front-side driven gear (driven gear), 550 drum gear, 560 driven gear, 570 relay gear, 600 detachable guide mechanism, 620 guide member, 650A, 650B side cover, 670A, 670B side cover, 655A, 675A guided member, 655B, 675B guided member, 670 side cover, 672 round hole, 680 operating member, 1000 control unit

The invention claimed is:

1. A paper sheet storage unit comprising:

a casing; and a circulation unit that is accommodated in the casing to receive paper sheets transported into the casing by operating upon reception of a drive force from a motor and feed paper sheets stored therein to outside of the casing, a first circulation unit and a second circulation unit that respectively receive transported paper sheets by operating upon reception of a drive force from the motor and feed paper sheets stored therein;

a sorting unit that sorts transported paper sheets to either one of the circulation units by changing a posture thereof;

a sorting-unit drive mechanism that drives the sorting unit; and a drive transmission switching mechanism that selectively switches and transmits the drive force from the motor to either one of the circulation units, wherein the casing includes a guide member that serves as a guide at a time of attaching or detaching the circulation unit to or from the casing by slidingly moving the circulation unit with respect to the casing, the circulation unit includes a guided member, which detachably engages with the guide member, and is guided to an installation completion position along the guide member in an engaged state, and the drive transmission switching mechanism is activated in conjunction with an operation of the sorting unit to change the posture, to switch and transmit the drive force from the motor to either one of the circulation units.

2. A paper sheet processing device comprising the paper sheet storage unit according to claim 1.

3. The paper sheet storage unit according to claim 1, wherein the circulation unit includes a movable component driven by the motor, and a plurality of gears that transmit a drive force from the motor to the movable component, and the respective gears are arranged on one side surface of the circulation unit corresponding to an axial one end side of the respective gears.

4. A paper sheet storage unit comprising:

a casing; and a circulation unit that is accommodated in the casing to receive paper sheets transported into the casing by operating upon reception of a drive force from a motor and feed paper sheets stored therein to outside of the casing, wherein the casing includes a guide member that serves as a guide at a time of attaching or detaching the circulation unit to or from the casing by slidingly moving the circulation unit with respect to the casing, the circulation unit includes a guided member, which detachably engages with the guide member, and is guided to an installation completion position along the guide member in an engaged state, the circulation unit includes a circulation drum that spirally winds two tapes around an outer periphery thereof in an overlapped state on each other and feeds each of the tapes in a process of rotating in forward and reverse directions, and two bobbins that respectively feed each of the tapes to the outer periphery of the circulation drum and wind each of the tapes in a process of rotating in forward and reverse directions, each of the tapes forms a linear contact travel area in which the tapes come in contact with each other and transport a paper sheet, while placing the paper sheet therebetween, at a position immediately before moving to the outer periphery of the circulation drum, and a guide direction of the guide member to guide the guided member is parallel to the linear contact travel area.

5. The paper sheet storage unit according to claim 4, further comprising:

a drum gear integrated with the circulation drum on one side surface thereof;

a driven gear meshed with the drum gear to transmit a drive force from the motor to the drum gear; and bobbin gears respectively integrated with a shaft of each of the bobbins to mesh with the drum gear, wherein the driven gear and the bobbin gears are respectively arranged on a same side surface as the drum gear.

6. The paper sheet storage unit according to claim 4, wherein the circulation unit includes a movable component driven by the motor, and a plurality of gears that transmit a drive force from the motor to the movable component, and the respective gears are arranged on one side surface of the circulation unit corresponding to an axial one end side of the respective gears.

7. A paper sheet processing device comprising the paper sheet storage unit according to claim 4.

* * * * *